US012807854B2

(12) United States Patent
Nakayama et al.

(10) Patent No.: US 12,807,854 B2
(45) Date of Patent: Nov. 24, 2026

(54) IRREGULARLY-SHAPED SILICA-BASED FINE PARTICLE DISPERSION, METHOD FOR PRODUCING SAME, PARTICLE-LINKED SILICA FINE PARTICLE DISPERSION, METHOD FOR PRODUCING SAME, AND ABRASIVE GRAIN DISPERSION FOR POLISHING

(71) Applicant: JGC CATALYSTS AND CHEMICALS LTD., Kawasaki (JP)

(72) Inventors: Kazuhiro Nakayama, Kitakyushu (JP); Daisuke Yamada, Kitakyushu (JP)

(73) Assignee: JGC CATALYSTS AND CHEMICALS LTD., Kawasaki (JP)

( * ) Notice: Subject to any disclaimer, the term of this patent is extended or adjusted under 35 U.S.C. 154(b) by 520 days.

(21) Appl. No.: 18/039,830

(22) PCT Filed: Jul. 30, 2021

(86) PCT No.: PCT/JP2021/028293

§ 371 (c)(1),
(2) Date: Jun. 1, 2023

(87) PCT Pub. No.: WO2022/123820

PCT Pub. Date: Jun. 16, 2022

(65) Prior Publication Data

US 2024/0002712 A1 Jan. 4, 2024

(30) Foreign Application Priority Data

Dec. 9, 2020 (JP) ................................ 2020-203938

(51) Int. Cl.
*C09K 3/14* (2006.01)
*B24B 37/24* (2012.01)
*C01B 33/143* (2006.01)

(52) U.S. Cl.
CPC ............ *C09K 3/1409* (2013.01); *B24B 37/24* (2013.01); *C01B 33/143* (2013.01);
(Continued)

(58) Field of Classification Search
CPC ....... C09K 3/1409; B24B 37/24; B24B 37/00; C01B 2004/03; C01B 33/1417;
(Continued)

(56) References Cited

U.S. PATENT DOCUMENTS

2020/0392004 A1 12/2020 Murakami et al.
2022/0055908 A1 2/2022 Komatsu et al.
2024/0317592 A1 9/2024 Fujimura et al.

FOREIGN PATENT DOCUMENTS

JP 2001-150334 A 6/2001
JP 2007-153692 A 6/2007
(Continued)

OTHER PUBLICATIONS

WO 2019131874 A1_Machine Translation (Year: 2019).*
(Continued)

*Primary Examiner* — Anthony J Green
*Assistant Examiner* — Anastasia A. Kuvayskaya
(74) *Attorney, Agent, or Firm* — Oliff PLC

(57) ABSTRACT

A method of producing a dispersion of irregularly shaped silica-based fine particles according to the invention includes steps (a) to (f) below: Step (a): obtaining a seed particle precursor dispersion by adjusting an aqueous alkali silicate solution so that ionic strength is 0.4 or more; Step (b): subjecting the seed particle precursor dispersion to heat-aging; Step (c): obtaining a seed particle dispersion by adding an acidic silicic acid solution to the seed particle precursor dispersion subjected to the heat-aging; Step (d): adjusting the seed particle dispersion so that the ionic strength is 0.25 or more; Step (e): subjecting the seed particle dispersion, of which $SiO_2$ concentration and ionic
(Continued)

Figure 1:
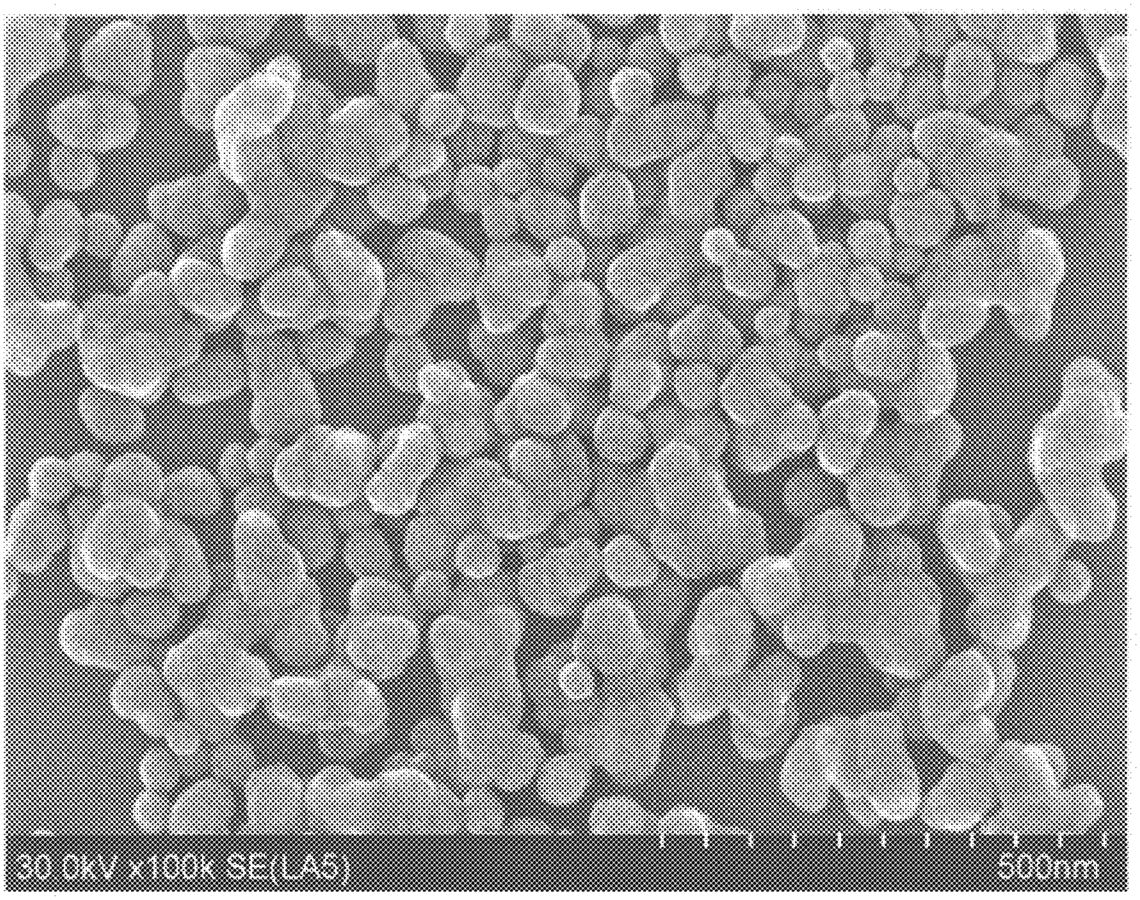

strength are adjusted, to heat-aging: and Step (f): obtaining a dispersion of irregularly shaped silica-based fine particles that contains irregularly shaped silica-based fine particles by adding an acidic silicic acid solution to the seed particle dispersion subjected to the heat-aging.

9 Claims, 2 Drawing Sheets

(52) U.S. Cl.
CPC ...... *C01P 2004/03* (2013.01); *C01P 2004/62* (2013.01); *C01P 2004/64* (2013.01); *C01P 2006/80* (2013.01)

(58) Field of Classification Search
CPC .............. C01P 2004/62; C01P 2004/64; C01P 2006/80; C09G 1/02; H01L 21/304
See application file for complete search history.

(56) References Cited

FOREIGN PATENT DOCUMENTS

| | | | | | |
|---|---|---|---|---|---|
| JP | 2008-137822 | A | | 6/2008 | |
| JP | 2009-149493 | A | | 7/2009 | |
| JP | 2011-098859 | A | | 5/2011 | |
| JP | 2011104694 | A | * | 6/2011 | |
| JP | 6207345 | B2 | | 10/2017 | |
| JP | 2017-206410 | A | | 11/2017 | |
| TW | 201934485 | A | | 9/2019 | |
| TW | 201936500 | A | | 9/2019 | |
| TW | 202039368 | A | | 11/2020 | |
| WO | WO-2019131874 | A1 | * | 7/2019 | ........... C01B 33/146 |
| WO | 2019/163992 | A1 | | 8/2019 | |
| WO | 2020/075654 | A1 | | 4/2020 | |
| WO | 2020/179558 | A1 | | 9/2020 | |

OTHER PUBLICATIONS

JP-2011104694-A_Machine Translation (Year: 2011).*

Sep. 12, 2024 Search Report and Written Opinion issued in Singaporean Patent Application No. 11202304308Y.

Partial Translation of Oct. 29, 2024 Office Action issued in Japanese Patent Application No. 2020-203938.

Jun. 13, 2023 International Preliminary Report on Patentability issued in International Patent Application No. PCT/JP2021/028293.

Dec. 9, 2024 Office Action issued in Taiwanese Patent Application No. 110128387.

Sep. 7, 2021 International Search Report issued in International Patent Application No. PCT/JP2021/028293.

* cited by examiner

IRREGULARLY-SHAPED SILICA-BASED FINE PARTICLE DISPERSION, METHOD FOR PRODUCING SAME, PARTICLE-LINKED SILICA FINE PARTICLE DISPERSION, METHOD FOR PRODUCING SAME, AND ABRASIVE GRAIN DISPERSION FOR POLISHING

TECHNICAL FIELD

The present invention relates to a dispersion of irregularly shaped silica-based fine particles and a method of producing the same.

BACKGROUND ART

As polishing particles, silica sol, fumed silica, fumed alumina, or the like is conventionally used. In producing a substrate with an integrated circuit for a semiconductor, aluminum wiring is formed on a silicon wafer and an oxide film made from silica or the like is provided thereon as an insulating film. Since recesses and protrusions are generated by the wiring, the oxide film is polished to be flat, Such substrate polishing desirably provides a polished surface that is flat (no level difference and no recesses and protrusions) and that is smooth (no microcracks and the like). Further, a high polishing rate is also required.

For example, Patent Literature 1 describes a method of polishing a semiconductor wafer with colloidal silica in which the number of colloidal silica particles having a long diameter of 7 to 1,000 nm and a short diameter/long diameter value of 0.3 to 0.8 accounts for 50% or more based on all the particles.

CITATION LIST

Patent Literature(s)

Patent Literature 1: JP 2001-150334 A
Patent Literature 2: JP patent No. 6,207,345 B

SUMMARY OF THE INVENTION

Problem(s) to be Solved by the Invention

In the method of polishing a semiconductor wafer described in Patent Literature 1, an average degree of shape irregularity of silica particles is high (a short diameter/long diameter value of 03 to 0.8), resulting in an improved polishing rate. However, when the average degree of shape irregularity of silica particles is too high, the polished substrate is likely to have scratches, reducing smoothness of the substrate surface.

Patent Literature 2 describes a polishing method in which a high polishing rate is obtained using irregularly shaped silica particles formed by clustering at least four or more silica primary particles. In the method of Patent Literature 2, the polishing rate is high by virtue of the structure formed by at least four or more of clustered particles. However, since an aggregating agent is used to form the cluster structure, the particles include a number of coarse particles and small spherical particles that are not clustered. The coarse particles are likely to cause polishing flaws. Further, small particles that are supposed to be effective for restoring the polishing flaws and smoothing the surface have a true spherical shape in Patent Literature 2, leading to a decrease in the polishing rate and restoration effect. In view of the above, there is a room for improvement.

An object of the invention is to provide a dispersion of irregularly shaped silica-based fine particles, which is usable as a polishing slurry, capable of improving smoothness of a substrate surface and increasing a polishing rate, and a method of producing the same.

Means for Solving the Problem(s)

According to an aspect of the invention, there is provided a method of producing a dispersion of irregularly shaped silica-based fine particles, the method including steps (a) to (f) below:

Step (a): obtaining a seed particle precursor dispersion by adjusting an aqueous alkali silicate solution so that a ratio of the number of moles of silica to the number of moles of alkali metal falls within a range of 0.5 to 10, and adding thereto alkali as needed so that a $SiO_2$ concentration falls within a range of 2 mass % to 25 mass % and ionic strength is 0.4 or more;

Step (b): subjecting the seed particle precursor dispersion obtained in the step (a) to heat-aging in a temperature range of 40 degrees C. or more but less than 100 degrees C.;

Step (c): obtaining a seed particle dispersion by adding an acidic silicic acid solution to the seed particle precursor dispersion subjected to the heat-aging in the step (b) so that a molar ratio of an amount of silica in the acidic silicic acid solution to an amount of silica in the seed particle precursor dispersion ([silica amount in acidic silicic acid solution]/[silica amount in seed particle precursor dispersion]) is in a range of 0.5 to 10;

Step (d): adjusting, through addition of alkali as needed, the seed particle dispersion obtained in the step (c) so that the $SiO_2$ concentration falls within a range of 2 mass % to 15 mass % and the ionic strength is 0.25 or more;

Step (e): subjecting the seed particle dispersion obtained in the step (d), of which $SiO_2$ concentration and ionic strength are adjusted, to heat-aging in a temperature range of 40 degrees C. or more but less than 100 degrees C.; and Step (f): obtaining a dispersion of irregularly shaped silica-based fine particles that contains irregularly shaped silica-based fine particles by adding an acidic silicic acid solution to the seed particle dispersion subjected to the heat-aging in the step (e) so that a molar ratio of an amount of silica in the acidic silicic acid solution to an amount of silica in the seed particle dispersion ([silica amount in acidic silicic acid solution]/[silica amount in seed particle dispersion]) falls within a range of 5 to 20.

According to another aspect of the invention, there is provided a dispersion of irregularly shaped silica-based fine particles containing irregularly shaped silica-based fine particles that satisfy conditions [1] to [4] below:

Condition [1]: an average particle size by a dynamic light scattering method is in a range of 10 nm to 300 nm;

Condition [2]: an average particle size in terms of a nitrogen adsorption method is in a range of 5 nm to 200 nm;

Condition [3]: an average degree of shape irregularity determined through analysis of a scanning electron micrograph is in a range of 1.2 to 10.0; and Condition [4]: in a particle size distribution determined through analysis of a scanning electron micrograph, provided that an average degree of shape irregularity of particles in a range where a ratio of the number of the particles counting from a side on which a particle size is small ([the number of particles counting from the side on which the particle size is small]/[a total number of particles]) is more than 0 and 1/10 or less is taken as [A], and an average degree of shape irregularity of particles in a range where the ratio of the number of the particles counting from the side on which the particle size is small ([the number of particles counting from the side on which the particle size is small]/[the total number of particles]) is more than 9/10 and 10/10 or less is taken as [B], a [B]/[A] value is 1.2 or more.

According to the aspects of the invention, there are provided a dispersion of irregularly shaped silica-based fine particles, which is usable as a polishing slurry, capable of improving smoothness of a substrate surface and increasing a polishing rate, and a method of producing the same.

BRIEF EXPLANATION OF DRAWING(S)

FIG. 1 is a scanning electron micrograph showing irregularly shaped silica-based fine particles obtained in Example 1-1.

Figure 2:
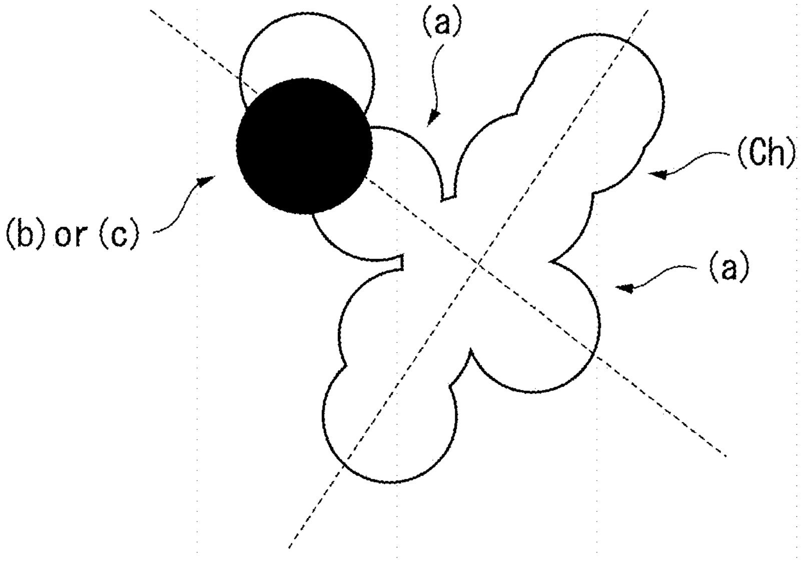

FIG. 2 schematically shows particle-linked type silica fine particles having a sterically branched structure in Examples 2-1 to 2-6.

DESCRIPTION OF EMBODIMENT(S)

Method of Producing Dispersion of Irregularly Shaped Silica-Based Fine Particles A method of producing a dispersion of irregularly shaped silica-based fine particles according to an exemplary embodiment is explained below.

The method of producing a dispersion of irregularly shaped silica-based fine particles according to the exemplary embodiment is characterized by including the following steps (a) to (f).

Herein, irregularly shaped silica-based fine particles refer to irregularly shaped particles other than spherical silica-based particles. The spherical silica-based particles herein refer to silica-based particles having a spherical shape. Examples of the irregularly shaped silica-based fine particles include all the particles having any other shapes than a spherical shape, such as primary silica fine particles obtained by crushing spherical silica-based particles, particles obtained by linking primary silica fine particles, and particles in a shape obtained by further growing, with silica, the particles obtained by linking primary silica fine particles. The wording of "linking primary silica fine particles" refers to fixing adjacent primary silica fine particles to each other through bonding generated therebetween. The types of bonding, which are not particularly limited, are exemplified by a chemical bond such as a siloxane bond generated by condensation of surface silanol groups of adjacent primary silica fine particles.

Step (a)

A step (a) is a step for obtaining a seed particle precursor dispersion by adjusting an aqueous alkali silicate solution so that a ratio of the number of moles of silica to the number of moles of alkali metal falls within a range of 0.5 to 10; and adding thereto alkali as needed so that a $SiO_2$ concentration falls within a range of 2 mass % to 25 mass % and an ionic strength is 0.4 or more.

When the ratio of the number of moles of silica to the number of moles of alkali metal in the seed particle precursor dispersion is less than 0.5, a large amount of alkali metal needs to be added, increasing production costs. Further, particles are likely to aggregate to be coarse particles. This easily causes sedimentation, making it difficult to form monodispersed seed particles. On the other hand, when the ratio of the number of moles of silica to the number of moles of alkali metal exceeds 10, it takes time and effort to obtain particles with a necessary size for polishing because the size of seed particles to be formed is so small. This leads to an increase in production cost. Further, the degree of shape irregularity of irregularly shaped particles to be obtained decreases, because the particles need to grow greatly. From the same viewpoint, the ratio of the number of moles of silica to the number of moles of alkali metal is preferably in a range of 1 to 5.

Examples of alkali metal in the aqueous alkali silicate solution include potassium, sodium, and lithium. The $SiO_2$ concentration and alkali concentration ($A_2O$ concentration) in the aqueous alkali silicate solution are not particularly limited. For example, the $SiO_2$ concentration is preferably in a range of 2 mass % to 25 mass %, more preferably in a range of 5 mass % to 25 mass %. The $A_2O$ concentration is preferably in a range of 0.5 mass % to 25 mass %, more preferably in a range of 2 mass % to 20 mass %.

When the $SiO_2$ concentration in the seed particle precursor dispersion is less than 2 mass %, the degree of shape irregularity of seed particles to be obtained decreases. When the $SiO_2$ concentration exceeds 25 mass %, aggregation progresses to cause sedimentation and coarse particles. From the same viewpoint, the $SiO_2$ concentration is preferably in a range of 5 mass % to 20 mass %, more preferably in a range of 8 mass % to 18 mass %.

When the ionic strength in the seed particle precursor dispersion is less than 0.4, the ionic strength is insufficient to facilitate association of seed particle precursors and nuclear particles formed in the steps (b), (c), and the like. The degree of shape irregularity of seed particles thus decreases. From the same viewpoint, the ionic strength is preferably in a range of 0.8 to 2.5, more preferably in a range of 1.2 to 2.0.

Herein, the ionic strength in a dispersion refers to a value calculated from a formula below. Elements used for the calculation of the ionic strength are referred only to alkali metal, alkali earth metal, and halogen that greatly affect aggregation and association of particles.

$$J = \frac{1}{2}\sum_{C_i} \cdot Z_i^2 \qquad \text{Formula 1}$$

In the above formula, J represents an ionic strength. Ci represents a molarity of the sum or any of alkali metal, alkali earth metal, and halogen in the system, and Zi represents a valence of each ion.

The molarity of each ion, which is an ion concentration of a substance that dissociates at a pH of a solution in which each substance is dissolved, is calculated using an acid dissociation constant pKa or a basic dissociation constant pKb of each substance. For example, when a salt that dissociates into A(−) and B(+) in water is added to a dispersion, the compound is separated into an acid AH and a base BOH, and the ion concentration of A(−) and H(+) and the ion concentration of B(+) and OH(−) are calculated. The same applies to an acid used for pH adjustment or the like.

AH is separated into A(−) and H(+) and the respective ion concentrations are calculated, and the ionic strength is determined using the above formula.

As alkali, a well-known alkali is usable as appropriate. Further, at least one ionic strength adjuster selected from the group consisting of sodium hydroxide and potassium hydroxide is preferably used as alkali.

Step (b)

The step (b) is a step for subjecting the seed particle precursor dispersion obtained in the step (a) to heat-aging in a temperature range of 40 degrees C. or more but less than 100 degrees C.

The step (b) provides solution homogenization or the like such as homogenization of silica solubility in the dispersion and homogenization of seed particle precursors in the dispersion. Herein, this stabilization operation is occasionally referred to as seeding.

In order to increase the ionic strength in the seed particle precursor dispersion, the pH in the seed particle precursor dispersion during the heat-aging is preferably 10 or more, and preferably 11 or more.

When the heating temperature is less than 40 degrees C. during the heat-aging, the effect of seeding is not obtainable. When the heating temperature is 100 degrees C. or more during the heat-aging, the reaction solution boils, making stable production impossible. From the same viewpoint, the temperature in heat-aging is preferably in a range of 60 degrees C. to 95 degrees C.

In order to obtain the effect of seeding, the aging time for heat-aging is preferably in a range of 20 minutes to 120 minutes, more preferably in a range of 60 minutes to 100 minutes.

As alkali, a well-known alkali is usable as appropriate. Further, at least one ionic strength adjuster selected from the group consisting of sodium hydroxide and potassium hydroxide is preferably used as alkali.

Step (c)

The step (c) is a step for obtaining a seed particle dispersion by adding an acidic silicic acid solution to the seed particle precursor dispersion subjected to heat-aging in the step (b) so that a molar ratio of the amount of silica in the acidic silicic acid solution to the amount of silica in the seed particle precursor dispersion ([silica amount in acidic silicic acid solution]/[silica amount in seed particle precursor dispersion]) falls within a range of 0.5 to 10.

When the molar ratio of the amount of silica in the acidic silicic acid solution to the amount of silica in the seed particle precursor dispersion is less than 0.5, the amount of silica is too small to form seed particles. Even if seed particles are formed, the size is small and stability thereof is unfavorable. When the above molar ratio exceeds 10, the degree of shape irregularity of seed particles decreases. From the same viewpoint, the above molar ratio is preferably in a range of 0.7 to 5, more preferably in a range of 1 to 2.

In order to facilitate dissolution of the acidic silicic acid solution and deposition to particles, the retention temperature when adding the acidic silicic acid solution is preferably 40 degrees C. or more but less than 100 degrees C., more preferably 60 degrees C. or more and 95 degrees C. or less.

When the time for adding the acidic silicic acid solution is less than one hour, the speed of addition of the acidic silicic acid solution is too high. This easily causes self-nucleation. When the time for adding the acidic silicic acid solution exceeds 15 hours, productivity is likely to decrease. From the same viewpoint, the time for adding the acidic silicic acid solution is more preferably in a range of 2 hours to 8 hours.

The retention time after the addition of the acidic silicic acid solution is preferably in a range of 10 minutes to 120 minutes.

In the seed particle dispersion obtained, an average particle size of seed particles by the dynamic light scattering method may be less than 5 nm. In this case, although the particles are grown to a size necessary for polishing in steps (d) and (e), the particles need to grow greatly and the degree of shape irregularity is likely to decrease. When the above average particle size exceeds 100 nm, the particle size after growth is too large and sedimentation is likely to occur. From the same viewpoint, the average particle size of seed particles by the dynamic light scattering method is more preferably in a range of 10 nm to 50 nm.

As the acidic silicic acid solution, an acidic silicic acid solution prepared by dealkalizing an aqueous solution of alkali silicate (e.g., alkali metal silicate and ammonium silicate) with a cation exchange resin is usable. The $SiO_2$ concentration of the acidic silicic acid solution is preferably in a range of 0.1 mass % to 10 mass %, more preferably in a range of 1 mass % to 7 mass %.

Step (d) and Step (e)

The step (d) is a step for adjusting, through addition of alkali as needed, the seed particle dispersion obtained in the step (c) so that the $SiO_2$ concentration falls within a range of 2 mass % to 15 mass % and the ionic strength is 0.25 or more.

The alkali used here is similar to the alkali used in the step (b).

The step (e) is a step of subjecting the seed particle dispersion obtained in the step (d), of which $SiO_2$ concentration and ionic strength are adjusted, to heat-aging at temperatures of 40 degrees C. or more but less than 100 degrees C.

When the $SiO_2$ concentration in the seed particle dispersion adjusted is less than 2 mass %, the concentration is low and productivity is decreased. When this $SiO_2$ concentration exceeds 15 mass %, aggregation progresses excessively to cause sedimentation and coarse particles. From the same viewpoint, this $SiO_2$ concentration is preferably in a range of 3 mass % to 10 mass %, more preferably in a range of 4 mass % to 8 mass %.

When the ionic strength in the seed particle dispersion adjusted is less than 0.25, the degree of shape irregularity decreases as irregularly shaped silica-based fine particles grow. From the same viewpoint, this ionic strength is preferably in a range of 0.3 to 0.7.

In order to increase the ionic strength in the seed particle dispersion, the pH in the seed particle dispersion during the heat-aging is preferably 10 or more.

When the heating temperature is less than 40 degrees C. during the heat-aging, the effect of seeding is not obtainable. When the heating temperature is 100 degrees C. or more during the heat-aging, the reaction solution boils, making stable production impossible. From the same viewpoint, the temperature in heat-aging is preferably 80 degrees C. or more but less than 100 degrees C.

In order to obtain the effect of seeding, the aging time for heat-aging is preferably in a range of 20 minutes to 120 minutes, more preferably in a range of 20 minutes to 60 minutes.

Step (f)

The step (f) is a step for obtaining a dispersion of irregularly shaped silica-based fine particles that contains irregularly shaped silica-based fine particles by adding an acidic silicic acid solution to the seed particle dispersion subjected to the heat-aging in the step (e) so that a molar ratio of the amount of silica in the acidic silicic acid solution to the amount of silica in the seed particle dispersion ([silica amount in acidic silicic acid solution]/[silica amount in seed particle dispersion]) falls within a range of 5 to 20.

The acidic silicic acid solution used here is similar to the acidic silicic acid solution used in the step (c).

When the molar ratio of the amount of silica in the acidic silicic acid solution to the amount of silica in the seed particle dispersion is less than 5, the particles do not grow to a desired size, making the polishing rate slow. When the above molar ratio exceeds 20, the particles grow excessively. This reduces the degree of shape irregularity of particles, making the polishing rate slow. From the same viewpoint, the above molar ratio is preferably in a range of 6 to 15.

In order to facilitate dissolution of the acidic silicic acid solution and deposition to particles, the retention temperature when adding the acidic silicic acid solution is preferably 40 degrees C. or more but less than 100 degrees C., and preferably 80 degrees C. or more but less than 100 degrees C.

When the time for adding the acidic silicic acid solution is too short, self-nucleation of silicic acid easily occurs, which is unfavorable. When the time for adding the acidic silicic acid solution is too long, economic efficiency decreases. Thus, the time for adding the acidic silicic acid solution is preferably in a range of 5 hours to 36 hours, more preferably in a range of 8 hours to 24 hours.

The retention time after the addition of the acidic silicic acid solution is preferably in a range of 10 minutes to 120 minutes.

In the step (f), the ratio of the number of moles of silica to the number of moles of alkali metal is preferably in a range of 30 to 150, more preferably in a range of 35 to 130, and still more preferably in a range of 40 to 120. The ratio of the number of moles of silica to the number of moles of alkali metal is a value obtained by dividing the total number of moles of silica by the total number of moles of alkali metal at the end of the step (f).

When the ratio of the number of moles of silica to the number of moles of alkali metal is less than the above lower limit, the amount of silica relative to that of alkali metal is insufficient. This makes the pH of the reaction solution too high and particle aggregation easily occurs. Even when no aggregation occurs, temporal stability is unfavorable. A particle size may thus increase with time or aggregation may occur. When the ratio of the number of moles of silica to the number of moles of alkali metal exceeds 150, the amount of silica relative to that of alkali metal is too large. This reduces the pH of the reaction solution, the acidic silicic acid solution added for particle growth does not contribute thereto, and self-nucleation is likely to occur.

Operation and Effect of Each Step

In the steps (e) and (f), the seed particles obtained in the step (c) are further associated for particle growth, so that the particles have a desired size and degree of shape irregularity. In this step, the ionic strength in the system is adjusted to a predetermined value or more through addition of alkali metal or the like to the solution containing the seed particles, and the concentration of seed particles (i.e., silica concentration in the step (e)) is adjusted within a predetermined range, thus associating seed particles. Accordingly, the degree of association is controllable. Then, in the step (f), an acidic silicic acid solution is added to this solution to obtain particles with a desired size and degree of shape irregularity while reinforcing the association structure by embedding silica in neck portions of the associated particles.

Since the associated seed particles are grown by the acidic silicic acid solution, the seed particles are strongly bonded. Thus, the particles do not disintegrate even when used for polishing. Further, the irregularly shaped particle ratio is high and the contact area with the substrate is large by virtue of the irregular shape, thus providing a high polishing rate. Furthermore, the degree of shape irregularity of small particles is also high, providing a high restoration effect on scratches caused by large particles.

When the silica concentration is less than 2% in the step (e), the seed particles are not likely to be associated. Even if the seed particles are associated, all the particles obtained have a low degree of shape irregularity. Further, since the reaction concentration is low, productivity is unfavorable. When the silica concentration exceeds 15%, productivity is high by virtue of the high concentration. In this case, however, aggregation of seed particles is likely to occur, which may cause coarse particles and sedimentation.

Examples of the ionic strength adjuster include alkali metal, alkali earth metal, halogen, salts thereof, and hydroxides thereof. The ionic strength adjuster used in the step (e) is preferably alkali metal hydroxides, because the alkali metal hydroxides function not only as the ionic strength adjuster but also as a catalyst for nucleation and particle growth. As the alkali metal hydroxides, NaOH or KOH may be added. An alkali metal hydroxide brought from alkali silicate that is a material is also usable.

When a halide salt (alkali halide) such as KCl or $CaCl_2$ is used as the ionic strength adjuster, the halide salt functions as an aggregating agent. Thus, aggregation of seed particles is likely to occur, which may cause coarse particles and sedimentation. When a small amount of aggregating agent is added for reaction to an extent that no sedimentation is caused, irregularly shaped particles are obtainable. However, due to the small amount of aggregating agent, only some particles have irregular shapes, and many true spherical particles or approximately true spherical particles, which are not irregularly shaped, are present. The particles obtained are thus likely to have a low irregularly shaped particle ratio. That is, particles with a small size have a low degree of shape irregularity, and aggregated particles with a large size have a high degree of shape irregularity. The degree of shape irregularity is polarized. Typically, small particles have a high smoothing effect for the polished substrate. However, when the particle size distribution is large, both large particles and small particles are present. Since small particles have a low polishing rate, the smoothing effect for the surface roughness deteriorated by large particles is insufficient. As a result, many scratches are formed.

When the ionic strength is less than 0.25, the ionic strength is insufficient for the association of particles. Even if the particles are associated, all the particles obtained have a low degree of shape irregularity. At an ionic strength of 0.7 or more, aggregation and sedimentation are likely to occur.

Dispersion of Irregularly Shaped Silica-Based Fine Particles

Subsequently, a dispersion of irregularly shaped silica-based fine particles is explained below.

The dispersion of irregularly shaped silica-based fine particles according to the exemplary embodiment is characterized by containing irregularly shaped silica-based fine particles that satisfy conditions [1] to [4] below.

The dispersion of irregularly shaped silica-based fine particles according to the exemplary embodiment can be produced by a method of producing the dispersion of irregularly shaped silica-based fine particles according to the exemplary embodiment.

Condition 1

A condition 1 is that an average particle size by dynamic light scattering is in a range of 10 nm to 300 nm.

At an average particle size by dynamic light scattering of less than 10 nm, the dispersion used as a polishing slurry provides a low polishing rate. When this average particle size exceeds 300 nm, the surface roughness, waviness, scratches and the like of the substrate surface deteriorate. From the same viewpoint, this average particle size is preferably in a range of 30 nm to 250 nm, more preferably in a range of 50 nm to 200 nm.

Condition 2

A condition 2 is that an average particle size in terms of the nitrogen adsorption method is in a range of 5 nm to 200 nm.

When the average particle size in terms of the nitrogen adsorption method is less than 5 nm, it is difficult to obtain a required polishing rate, and small particles are likely to remain on the substrate. When this average particle size exceeds 200 nm, scratches occur or the surface roughness and waviness of the polished substrate deteriorate. From the same viewpoint, this average particle size is preferably in a range of 10 nm to 150 nm, more preferably in a range of 20 nm to 100 nm.

Condition 3

A condition 3 is that an average degree of shape irregularity determined through analysis of a scanning electron micrograph is in a range of 1.2 to 10.

When the average degree of shape irregularity determined through analysis of a scanning electron micrograph is less than 1,2, the degree of shape irregularity is not enough and a contact area with the substrate is small. In this case, the dispersion used as a polishing slurry provides a low polishing rate. When this average degree of shape irregularity exceeds 10, such particles need a complicated production process, making stable industrial production difficult. Further, economical efficiency is also unfavorable. In addition, the particles having a degree of shape irregularity of 10 or more are not further improved in polishing rate, instead, likely to cause scratches. From the same viewpoint, this average degree of shape irregularity is more preferably in a range of 1.2 to 5.

Herein, the average degree of shape irregularity is determined through analysis of a scanning electron micrograph. Specifically, a scanning electron micrograph is observed to determine a rectangle having the minimum area among circumscribed rectangles circumscribing the respective particles. Lengths of a longer side and a shorter side of the circumscribed rectangle are determined to define a ratio of the longer side to the shorter side ([longer side]/[shorter side]) as the degree of shape irregularity. The degrees of shape irregularity of the respective particles are calculated, and an average value thereof is determined as the average degree of shape irregularity.

Condition 4

A condition 4 is as follows: in a particle size distribution determined through analysis of a scanning electron micrograph, provided that an average degree of shape irregularity of particles in a range where the ratio of the number of the particles counting from the side on which the particle size is small ([the number of particles counting from the side on which the particle size is small]/[the total number of particles]) is more than 0 and 1/10 or less is taken as [A], and an average degree of shape irregularity of particles in a range where the ratio of the number of the particles counting from the side on which the particle size is small ([the number of particles counting from the side on which the particle size is small]/[the total number of particles]) is more than 9/10 and 10/10 or less is taken as [B], a [B]/[A] value is 1.2 or more.

As the particle size used for determining the above ratio, a diameter of an area-equivalent circle is used. The diameter of the area-equivalent circle is determined through analysis of a scanning electron micrograph. Specifically, a scanning electron micrograph is observed to determine an area of each particle, and the diameter of the circle, of which area is equivalent to the particle area determined, is used as the diameter of the area-equivalent circle.

At a [B]/[A] value of 1.2 or more, the polishing rate is improvable while inhibiting scratches.

Here, [A] is an average degree of shape irregularity of a relatively small particle group, and [B] is an average degree of shape irregularity of a relatively large particle group. Thus, a [B]/[A] value of 1 or more shows that the degree of shape irregularity is likely to be larger as the particle size is larger.

When the average degree of shape irregularity is in a predetermined range (1.2 to 10) and the B/A value is 1.2 or more, it shows that the degree of shape irregularity is high as a whole and both a small particle side component and a large particle side component have a high degree of shape irregularity.

Typically, small particles and large particles greatly affect the polishing performance. The polishing rate of large particles is very high, and the polishing rate improves as the degree of shape irregularity is higher. Large particles thus greatly contribute to the improvement in polishing rate of the entire abrasive grains. However, large particles are likely to deteriorate the surface roughness of the substrate or cause polishing scratches.

On the other hand, small particles greatly affect the polishing performance, because the polishing rate of small particles is low, reducing the polishing rate of the entire abrasive grains. Small particles, however, greatly contribute to the smoothness of the substrate surface, exhibiting the surface smoothness effect and the restoration effect of scratches caused by coarse particles or the like. That is, when the degree of shape irregularity of small particles is moderately high, not only the restoration effect of the surface roughness, scratches, and the like but also the polishing rate are improvable. The degree of shape irregularity of small particles is thus preferably high.

Therefore, when the degree of shape irregularity of small particles and the B/A value are high, the polishing rate is sufficiently high and a smooth substrate surface with few scratches is obtainable.

The inventors consider that such a mechanism is available at a [B]/[A] value of 1.2 or more, improving the polishing rate while inhibiting scratches.

From the same viewpoint, the [B]/[A] value is preferably in a range of 1.2 to 2, more preferably in a range of 1.2 to 1.80.

From the above viewpoint, the [A] value is preferably 1.13 or more, more preferably in a range of 1.15 to 1.8. The reasons thereof are as follows: when the [A] value is less than 1.13, both the degree of shape irregularity and the polishing rate are low, decreasing the surface smoothness effect; and when the [A] value exceeds 1.8, both the degree of shape irregularity and the polishing rate are high, but the effect of deteriorating the surface roughness is larger than the surface smoothness effect.

Condition 5

A condition 5 is as follows: when the degree of shape irregularity of particles is determined through analysis of a scanning electron micrograph, the ratio of irregularly shaped particles to all particles ([the number of particles having a degree of shape irregularity of 1.2 or more]/[the total number of particles]×100%) is 45% or more. In the exemplary embodiment, satisfying the condition 5 is more preferable.

At a ratio of irregularly shaped particles to all particles of 45% or more, the polishing rate is further improved. From the same viewpoint, the irregularly shaped particle ratio is preferably in a range of 48% to 95%, more preferably in a range of 50% to 90%. The reasons thereof are as follows: at an irregularly shaped particle ratio exceeding 95%, the polishing rate is high, but the surface roughness of the substrate is likely to deteriorate and scratches are likely to occur; and at an irregularly shaped particle ratio less than 45%, many spherical particles are present, decreasing the polishing rate.

Condition 6

A condition 6 is as follows: provided that the number of particles each having a steric structure is taken as T and the total number of particles is taken as S through analysis of a scanning electron micrograph, a steric structure ratio (T/S×100%) is 10% or more. In the exemplary embodiment, satisfying the condition 6 is more preferable. The particle having a steric structure includes a steric portion as compared to the spherical or planar particles. This allows stress to concentrate on the substrate, facilitating the polishing rate.

At a steric structure ratio of 10% or more, the polishing rate is improvable. From the same viewpoint, the steric structure ratio is preferably in a range of 12% to 95%, more preferably in a range of 15% to 90%. This is because, although the polishing rate is high at a steric structure ratio exceeding 95%, many polishing scratches are likely to occur, deteriorating the surface smoothness.

Whether or not the particle has a steric structure can be determined by a color tone of the particle in a scanning electron micrograph. Further, the steric portion of the particle can be determined by observation using both a scanning electron micrograph and a transmission electron micrograph.

Use

The dispersion of irregularly shaped silica-based fine particles according to the exemplary embodiment, which is usable as a polishing slurry, provides improved surface smoothness of the substrate and a high polishing rate. Thus, the dispersion of irregularly shaped silica-based fine particles according to the exemplary embodiment is suitably usable as a component of a polishing composition or a polishing slurry.

Note that the polishing composition and the polishing slurry may contain any other component. As any other component, at least one component selected from a polishing accelerator, a surfactant, a hydrophilic compound, a heterocyclic compound, a pH adjuster, and a pH buffer is usable.

EXAMPLES

The invention is explained in more detail below with Examples and Comparatives. The invention, however, is not limited thereto.

Example 1-1

Preparation of Seed Particle Dispersion

To 329 g of pure water was added 1.0 kg of an aqueous potassium silicate solution (aqueous potassium silicate solution No. 2 produced by FUJI CHEMICAL Co., Ltd., $SiO_2$ concentration: 20.5 mass %, $K_2O$ concentration: 9.4 mass %, the ratio of the number of moles of silica to the number of moles of alkali metal: 2.04). Further, 157 g of an aqueous potassium hydroxide solution ("Super Kali R" produced by TOAGOSEI CO., LTD., KOH concentration: 48.0 mass %) was added thereto, followed by stirring until it became uniform (step (a)). In this solution, the pH was 12.9, the electric conductivity was 92.3 mS/cm, the $SiO_2$ concentration was 13.8 mass %, and the ionic strength was 1.305. Then, the solution's temperature was increased to 72 degrees C. while stirring, and kept at 72 degrees C. for 80 minutes. A seed particle precursor dispersion subjected to heat-aging was thus obtained (step (b)).

Subsequently, while maintaining the solution's temperature, 6.51 kg of an acidic silicic acid solution ($SiO_2$ concentration: 4.55 mass %) was added thereto for five hours. The molar ratio of the amount of silica in the acidic silicic acid solution to the amount of silica in the seed particle precursor dispersion ([silica amount in acidic silicic acid solution]/[silica amount in seed particle precursor dispersion]) was 1.44. Even after completion of the acidic silicic acid solution addition, the solution was stirred for one hour with the solution's temperature kept at 72 degrees C. Then, the solution was allowed to cool to room temperature. A seed particle dispersion was thus obtained (step (c)). In the seed particle dispersion obtained, the ratio of the number of moles of silica to the number of moles of alkali metal was 5.0. The average particle size of the obtained seed particles measured by the dynamic light scattering method was 27 nm.

Preparation of Dispersion of Irregularly Shaped Silica-Based Fine Particles

To 700 g of the obtained seed particle dispersion was added 144 g of pure water, followed by stirring until it became uniform. In this seed particle dispersion, the $SiO_2$ concentration was 5.2 mass %, and the ionic strength was 0.368 (step (d)). Further, the temperature of the seed particle dispersion was increased to 97.5 degrees C. while stirring, and kept at 97.5 degrees C. for 30 minutes (step (e)). Next, while maintaining 97.5 degrees C., 8.96 kg of a 4.55 mass % acidic silicic acid solution was added thereto for 12 hours. The molar ratio of the amount of silica in the acidic silicic acid solution to the amount of silica in the seed particle dispersion ([silica amount in acidic silicic acid solution]/[silica amount in seed particle dispersion]) was 9.3. Even after completion of the acidic silicic acid solution addition, the solution was continuously stirred while being kept at 97.5 degrees C. for one hour, and then allowed to cool to room temperature. A dispersion of irregularly shaped silica-based fine particles was thus obtained (step (f)). In the dispersion of irregularly shaped silica-based fine particles obtained, the ratio of the number of moles of silica to the number of moles of alkali metal was 51.2.

The dispersion of irregularly shaped silica-based fine particles obtained was concentrated to a silica concentration of 12 mass % using an ultrafiltration membrane, and then concentrated to 20 mass % in a rotary evaporator. In the irregularly shaped silica-based fine particles obtained, the particle size in terms of specific surface area was 49 nm, and the particle size by dynamic light scattering was 124 nm.

Table 1 shows conditions and the like for the method of producing the dispersion of irregularly shaped silica-based fine particles.

Examples 1-2 and 1-3

Dispersions of irregularly shaped silica-based fine particles were each obtained through the respective steps in accordance with the conditions and the like shown in Table 1.

Comparative 1-1

Preparation of Seed Particles (a)

To 87.8 g of potassium silicate ($SiO_2$ concentration: 20.5 mass %, $K_2O$ concentration: 9.37%) was added 1,127 g of pure water. Further, 31.4 g of an aqueous potassium hydroxide solution (KOH concentration: 3 mass %) was added thereto, followed by stirring. Then, the solution's temperature was increased to 83 degrees C. and kept at 83 degrees C. for 30 minutes. A precursor dispersion was thus obtained. The $SiO_2$ concentration of this solution was 1.45 mass %.

Subsequently, 1,494 g of an acidic silicic acid solution ($SiO_2$ concentration: 4.6 mass %) was continuously added thereto for three hours. Then, 8,963 g of an acidic silicic acid solution was continuously added thereto for 12 hours. After the addition was completed, the solution's temperature was kept at 83 degrees C. for one hour, and allowed to cool to room temperature. The particle size of the obtained seed particles (a) by the dynamic light scattering method was 35 nm.

The silica sol obtained was concentrated to a silica concentration of 12 mass % using an ultrafiltration membrane, and then concentrated to 20 mass % in a rotary evaporator.

Preparation of Particles (A)

To 1,692 g of pure water was added 26.0 g of an aqueous potassium hydroxide solution (KOH concentration: 48.5 mass %), followed by stirring until it became uniform. While stirring, 460.7 g of a 4.6 mass % acidic silicic acid solution was added, and then 355 g of seed particles (a) were added. The $SiO_2$ concentration of this solution was 6.5 mass %. The solution's temperature was increased to 87 degrees C., and kept at 87 degrees C. for 30 minutes. Next, while maintaining 87 degrees C., 11,388 g of a 4.6 mass % acidic silicic acid solution was added thereto for 14 hours. Even after completion of the addition, the solution was continuously stirred while being kept at 87 degrees C. for one hour, and then allowed to cool to room temperature. A silica sol containing particles (A) was thus obtained.

The silica sol obtained was concentrated to 12 mass % using an ultrafiltration membrane, and then concentrated to 20 mass % in a rotary evaporator. In the particles (A) obtained, the particle size by dynamic light scattering was 64 nm, and the particle size in terms of specific surface area was 43 nm.

Comparative 1-2

Preparation of Particles (B)

To 23,142 g of pure water was added 274.7 g of an aqueous potassium hydroxide solution (KOH concentration: 48.5 mass %), followed by stirring until it became uniform. While stirring, 4,951 g of a 4.52 mass % acidic silicic acid solution was added, and then 3,336.8 g of silica sol obtained in the same manner as in the preparation of particles (A) in Comparative 1 was added. The $SiO_2$ concentration of this solution was 5.0 mass %. The solution's temperature was increased to 98 degrees C., and kept at 98 degrees C. for 30 minutes. Next, while maintaining 98 degrees C., 128.65 kg of a 4.52 mass % acidic silicic acid solution was added thereto for 18 hours. Even after completion of the addition, the solution was continuously stirred while being kept at 98 degrees C. for one hour, and then allowed to cool to room temperature. A silica sol containing particles (B) was thus obtained.

The silica sol obtained was concentrated to 12 mass % using an ultrafiltration membrane, and then concentrated to 20 mass % in a rotary evaporator. In the particles (B) obtained, the particle size by dynamic light scattering was 110 nm, and the particle size in terms of specific surface area was 80 nm.

Comparative 1-3

A dispersion of irregularly shaped silica-based fine particles was obtained in the same manner as in Example 1-1 using a seed particle dispersion obtained in the same manner as in Example 1-1, except that the amount of pure water added to the seed particle dispersion in the step (d) of Example 1-1 was changed to 1,909 g in Comparative 1-3.

The dispersion of irregularly shaped silica-based fine particles obtained was concentrated to a silica concentration of 12 mass % using an ultrafiltration membrane, and then concentrated to 20 mass % in a rotary evaporator. In the irregularly shaped silica-based fine particles obtained, the particle size by dynamic light scattering was 47 nm, and the particle size in terms of specific surface area was 27 nm.

Comparative 1-4

Preparation of Particles (D)

To 9,483 g of pure water was added 3,294 g of an aqueous sodium silicate solution ($SiO_2$ concentration: 24.3 mass %), followed by stirring until it became uniform. Then, 347 g of a 4.5 mass % acidic silicic acid solution and 254 g of 20 mass % KCl (aggregating agent) were added thereto for five minutes, and mixed (step (a)). The $SiO_2$ concentration of this solution was 6.1 mass %, Then, the solution's temperature was increased to 97 degrees C. and kept at 97 degrees C. for 30 minutes (step (b)).

The rotation speed of stirring blades in the steps (a) and (b) was 2.5/sec. Subsequently, 281.8 kg of an acidic silicic acid solution was added to the solution for 15 hours. After completion of the addition, the solution was kept at 97 degrees C. for 30 minutes. The Reynolds number at this time was $1.36\times10^5$, which was calculated from the shape of the tank used, the shape of the blades, the size of the blades, the dispersion density, and the viscosity. Subsequently, the solution was cooled to room temperature and concentrated using an ultrafiltration module, to thereby obtain a silica sol containing particles (D) of which solid content concentration was 10 mass %. Next, the solution was concentrated to 20 mass % in a rotary evaporator. In the particles (D) obtained, the particle size by dynamic light scattering was 155 nm, and the particle size in terms of specific surface area was 65 nm.

Comparative 1-5

Preparation of Potassium Silicate Solution

To 3.699 kg of ultrapure water was added 2.766 kg of an aqueous potassium hydroxide solution (KOH concentration: 48.7 mass %), followed by stirring until it became uniform.

To the aqueous potassium hydroxide solution was added 2.82 kg of silica powder (moisture amount: 20 mass %), and mixed. The temperature of the mixed solution was increased to 95 degrees C. and kept at that temperature for four hours to obtain a potassium silicate solution.

In the potassium silicate solution obtained, the $SiO_2$ concentration was 24.5 mass %, the $K_2O$ concentration was 12.4 mass %, and $SiO_2/K_2O$ (molar ratio) was 3.10 (hereinafter, this potassium silicate solution and a potassium silicate solution equivalent thereto are referred to as "potassium silicate solution (1)").

Preparation of Precursor Dispersion

To 2.344 kg of ultrapure water was added 0.88 kg of the potassium silicate solution (1), followed by stirring until it became uniform. An alkaline aqueous solution was thus obtained. To the alkaline aqueous solution was added 0.15 kg of an acidic silicic acid solution, and mixed. The temperature of the mixed solution was increased to 98.5 degrees C. and kept at that temperature for 1.3 hours to obtain a precursor dispersion. In the precursor dispersion, the $SiO_2$ concentration was 6.6 mass %, and $SiO_2/A_2O$ (molar ratio) was 3.2.

Preparation of Seed Particles (e)

To the total amount of the precursor dispersion thus obtained was added 6.97 kg of an acidic silicic acid solution at 98.5 degrees C. for 4.9 hours. Even after completion of the addition, the solution's temperature was kept at 98.5 degrees C. for 0.5 hours to obtain a dispersion of seed particles (e).

In this seed particle dispersion, the $SiO_2$ concentration was 5.2 mass %, and the $K_2O$ concentration was 1.1 mass %. The average particle size measured by a dynamic light scattering type particle size measuring device was 105 nm.

Preparation of Particles (E)

To 0.113 kg of ultrapure water was added 0.006 kg of the potassium silicate solution (1). To this solution was added 10.34 kg of the seed particle dispersion containing seed particles (e), and mixed. The $SiO_2$ concentration of this solution was 5.2 mass %. Then, the solution's temperature was increased to 97.5 degrees C. and kept at that temperature for 0.5 hours.

After that, while maintaining 97.5 degrees C., 142.94 kg of an acidic silicic acid solution was added thereto for 12 hours. Even after completion of the addition, the solution's temperature was kept at 97.5 degrees C. for one hour, and then cooled to room temperature. A silica particle dispersion containing particles (E) was thus obtained. In the silica particle dispersion obtained, the $SiO_2$ concentration was 4.6 mass %, and the $K_2O$ concentration was 0.07 mass %.

Subsequently, the solution was concentrated using an ultrafiltration module to prepare a silica particle dispersion having a $SiO_2$ concentration of 11.7 mass %, Next, the solution was concentrated to 20 mass % in a rotary evaporator. In the particles (E) obtained, the particle size in terms of specific surface area was 41 nm, and the particle size by dynamic light scattering was 131 nm.

Evaluation of Dispersion of Irregularly Shaped Silica-Based Fine Particles and Method of Producing the Same Table 1 shows conditions and the like for the method of producing the dispersion of irregularly shaped silica-based fine particles.

Measurement of physical properties of the irregularly shaped silica-based fine particles and evaluation of the dispersion of irregularly shaped silica-based fine particles were performed in accordance with the following methods. Table 2 shows the results. FIG. 1 is a scanning electron micrograph showing irregularly shaped silica-based fine particles obtained in Example 1-1.

(1) Measurement of Average Particle Size

The seed particle dispersion and the dispersion of irregularly shaped silica-based fine particles were measured for the average particle size by the dynamic light scattering method. Further, the dispersion of irregularly shaped silica-based fine particles was measured for the average particle size in terms of the nitrogen adsorption method.

(2) Analysis of Scanning Electron Micrograph Showing Irregularly Shaped Silica-Based Fine Particles (2-1) Average Degree of Shape Irregularity The average degree of shape irregularity was determined through analysis of a scanning electron micrograph. Specifically, a scanning electron micrograph was observed to determine a minimum circumscribed rectangle having the minimum area among circumscribed rectangles circumscribing respective 100 or more particles randomly selected. Lengths of a longer side and a shorter side of the minimum circumscribed rectangle were determined to define a ratio of the longer side to the shorter side ([longer side]/[shorter side]) as the degree of shape irregularity. The degrees of shape irregularity of the respective particles were calculated to determine an average value thereof as the average degree of shape irregularity.

(2-2) Average Particle Size of Area-Equivalent Circle

The average particle size of an-area-equivalent circles was obtained by observing a scanning electron micrograph. A projected area of each of 100 or more particles randomly selected was obtained, and a diameter of a circle having an area equivalent to the projected area was used as the particle size of each of the particles.

(2-3) Average Degree of Shape Irregularity [A] and Average Degree of Shape Irregularity [B] in Particle Groups, and [B]/[A] Value A scanning electron micrograph was analyzed to determine a particle size distribution for 100 or more particles randomly selected. Note that the particle size here means an average particle size of the area-equivalent circles. In this particle size distribution, an average degree of shape irregularity [A] of particles in a range where the ratio of the number of the particles counting from the side on which the particle size is small ([the number of particles counting from the side on which the particle size is small]/[the total number of particles]) was more than 0 and 1/10 or less was determined, an average degree of shape irregularity [B] of particles in a range where the ratio of the number of the particles counting from the side on which the particle size is small ([the number of particles counting from the side on which the particle size is small]/[the total number of particles]) was more than 9/10 and 10/10 or less was determined, and a [B]/[A] value was calculated.

(2-4) Irregularly Shaped Particle Ratio

A scanning electron micrograph was analyzed to determine a degree of shape irregularity of each of 100 or more particles randomly selected. The irregularly shaped particle ratio based on all particles ([the number of particles having a degree of shape irregularity of 1.2 or more]/[the total number of particles]×100%) was calculated.

(2-5) Steric Structure Ratio

A scanning electron micrograph was analyzed to determine the number of particles each having a steric structure T among 100 or more particles randomly selected. The ratio of the number of particles having the steric structure T to the total number of particles S (T/S×100%) was determined as a steric structure ratio.

(2-6) The Number of Coarse Particles

The number of coarse particles in the dispersion of irregularly shaped silica-based fine particles was measured using Accusizer 780APS produced by Particle sizing system Inc. Further, a measurement sample was diluted with pure water to 1 mass %, and 5 mL of the dilution was poured in a measuring device. Measurement was performed three times under the following conditions to calculate, from the obtained measurement data, an average value of the number of coarse particles having 0.51 μm or more. Further, the average value was multiplied by 100 to be determined as the number of coarse particles in the dispersion of irregularly shaped silica-based fine particles in terms of dry particles. The measurement conditions are as follows.

<System Setup>

Stir Speed Control/Low Speed Factor 1500/High Speed Factor 2500

<System Menu>

Data Collection Time 60 Sec.

Syringe Volume 2.5 mL

Sample Line Number: Sum Mode

Initial 2nd-Stage Dilution Factor 350

Vessel Fast Flush Time 35 Sec.

System Flush Time/Before Measurement 60 Sec./After Measurement 60 Sec.

Sample Equilibration Time 30 Sec./Sample Flow Time 30 Sec.

(3) Polishing Properties of Dispersion of Irregularly Shaped Silica-Based Fine Particles (3-1) Preparation of Polishing Slurry for Evaluation Pure water was added to the dispersion of irregularly shaped silica-based fine particles to adjust the $SiO_2$ concentration to 1.0 mass %. Nitric acid 5% was further added dropwise to adjust the pH to 6.0. A polishing slurry for evaluation was thus obtained.

(3-2) TEOS Film Polishing Rate

As a polishing device, NF-300 produced by Nano Factor Co., Ltd. was used. As a polishing pad, IC-1000/SUBA400, which was a double-layered pad, was used. A substrate was prepared by cutting an 8-inch plasma TEOS film (film thickness: 2 μm) into a size of 29 mm square. Polishing was performed for 15 minutes under the following conditions: a polishing load of 0.08 MPa, a head rotation speed of 93 rpm, a platen rotation speed of 87 rpm, and a slurry flow rate of 50 g/min. A difference in weight of the substrate before and after polishing was calculated as a polished film thickness.

(3-3) Polishing Scratches [Polishing Test]

Substrate to be Polished

A nickel-plated aluminum substrate (nickel-plated substrate produced by Toyo Kohan Co., Ltd.) for use in hard disks was used as a substrate to be polished. The substrate is a doughnut-shaped substrate (outer diameter: 95 mm, inner diameter: 25 mm, thickness: 1.27 mm).

Polishing Test

There was prepared 344 g of a 9 mass % silica-based particle dispersion, to which 5.65 g of a 31 mass % hydrogen peroxide solution was added. After that, the pH of the solution was adjusted to 1.5 with 10 mass % nitric acid to prepare a polishing slurry.

The substrate to be polished was set on a polishing device (NF300 produced by Nano Factor Co., Ltd.). A polishing pad (Bellatrix N0178 produced by FILWEL CO., LTD.) was used to polish the substrate to a depth of 1 μm at a substrate load of 0.05 MPa, a disk rotation speed of 50 rpm, and a head rotation speed of 50 rpm while supplying the polishing slurry at a rate of 40 g/min.

Polishing Scratches in Substrate

The polished substrate obtained by the polishing test was observed using an ultrafine defect visualizing macro inspection system (product name: Maicro-Max VMX-3100 produced by Vision Psytec). Observation conditions were as follows: MME-250 W white light adjusted to 10% and LA-180Me to 0%.

In this observation, when defects are present at the substrate surface due to scratches or the like, white light is diffusely reflected and defect portions are observed in white color. On the other hand, white light is specularly reflected at portions having no defect and the whole surface is observed in black color. Through such an observation, the area of defects due to scratches (linear scratches) present at the substrate surface (area of portions of the substrate observed in white color) under the following criteria:

"Very small": the area of defects is less than 3%;

"Small": the area of defects is 3% or more but less than 20%;

"Large": the area of defects is 20% or more but less than 40%; and

"Very Large": the area of defects is 40% or more.

TABLE 1

| Step | | Condition etc. | Unit | Ex. 1-1 | Ex. 1-2 | Ex. 1-3 | Comp. 1-1 | Comp. 1-2 | Comp. 1-3 | Comp. 1-4 | Comp. 1-5 |
|---|---|---|---|---|---|---|---|---|---|---|---|
| Preparation of seed particle dispersion | Step (a) | Ratio of the number of moles of silica to the number of moles of alkali metal | — | 2.04 | 2.04 | 2.04 | 3.13 | 20.2 | 2.04 | 3.2 | 3.2 |
| | | $SiO_2$ concentration | % | 13.8 | 13.8 | 13.8 | 1.45 | 6.5 | 13.8 | 6.1 | 6.6 |
| | | Ionic strength | — | 1.305 | 1.305 | 1.305 | 0.16 | 0.115 | 1.305 | 0.732 | 0.362 |
| | Step (b) | Heating temperature | ° C. | 72.0 | 80.0 | 80.0 | 83.0 | 87.0 | 72.0 | 97.0 | 97.5 |
| | | pH | | 12.9 | 12.9 | 12.9 | — | — | 12.9 | — | — |
| | Step (c) | Aggregating agent | — | Not contained | Not contained | Not contained | Not contained | Not contained | Not contained | Contained | Not contained |
| | | Molar ratio of the amount of silica in acidic silicic acid solution to the amount of silica in seed particle precursor dispersion | — | 1.44 | 1.44 | 1.44 | 26.71 | 3.13 | 1.44 | 15.54 | 1.86 |

TABLE 1-continued

| Step | | Condition etc. | Unit | Ex. 1-1 | Ex. 1-2 | Ex. 1-3 | Comp. 1-1 | Comp. 1-2 | Comp. 1-3 | Comp. 1-4 | Comp. 1-5 |
|---|---|---|---|---|---|---|---|---|---|---|---|
| Preparation of dispersion of irregularly shaped silica-based fine particles | Step (d) | $SiO_2$ concentration | % | 5.2 | 5.2 | 6.3 | 6.5 | 5.0 | 1.5 | No step | 5.15 |
| | | Ionic strength | — | 0.368 | 0.368 | 0.449 | 0.115 | 0.095 | 0.102 | | 0.236 |
| | Step (e) | Heating temperature | ° C. | 97.5 | 97.5 | 97.5 | 87.0 | 98.0 | 97.5 | | 97.5 |
| | Step (f) | Molar ratio of the amount of silica in acidic silicic acid solution to the amount of silica in seed particle dispersion | — | 9.3 | 9.3 | 9.3 | 3.8 | 4.4 | 9.3 | | 12.2 |
| | | Ratio of the number of moles of silica to the number of moles of alkali metal | — | 51.2 | 51.2 | 51.2 | 84.6 | 86.1 | 51.2 | | 101.7 |

TABLE 2

| | | Unit | Ex. 1-1 | Ex. 1-2 | Ex. 1-3 | Comp. 1-1 | Comp. 1-2 | Comp. 1-3 | Comp. 1-4 | Comp. 1-5 |
|---|---|---|---|---|---|---|---|---|---|---|
| Physical properties of seed particles | Average particle size by dynamic light scattering | nm | 27 | 39 | 39 | 35 | 64 | 27 | — | 105 |
| Physical properties of irregularly shaped silica-based fine particles | Average particle size by dynamic light scattering | nm | 124 | 155 | 107 | 64 | 110 | 47 | 155 | 131 |
| | Average particle size in terms of nitrogen adsorption method | nm | 49 | 64 | 48 | 43 | 80 | 27 | 65 | 41 |
| | Average degree of shape irregularity | — | 1.36 | 1.24 | 1.20 | 1.10 | 1.07 | 1.18 | 1.17 | 1.15 |
| | Average degree of shape irregularity [A] of particle group in a range of 0 to 10% from the side on which the particle size is small | — | 1.17 | 1.19 | 1.15 | 1.10 | 1.10 | 1.21 | 1.10 | 1.18 |
| | Average degree of shape irregularity [B] of particle group in a range of 90 to 100% from the side on which the particle size is small | — | 1.53 | 1.53 | 1.55 | 1.21 | 1.09 | 1.34 | 1.30 | 1.33 |
| | [B]/[A] | — | 1.31 | 1.29 | 1.35 | 1.10 | 0.99 | 1.11 | 1.18 | 1.13 |
| | Irregularly shaped particle ratio (a degree of shape irregularity of 1.2 or more) | % | 83.3 | 0.1 | 60.1 | 11.2 | 2.5 | 42 | 43.5 | 34.2 |
| | Steric structure ratio | % | 31.4 | 15.2 | 20.1 | 0.0 | 0.0 | 0.4 | 9.4 | 1.8 |
| | The number of coarse particles having 0.51 µm or more | 1,000 particles/cc | 2,066 | 2,483 | 5,845 | 665 | 369 | 1,218 | 36,620 | 3,666 |
| Polishing properties | Polished film thickness of TEOS film (polished film thickness for 15 mins) | nm | 296 | 286 | 458 | 108 | 146 | 94 | 544 | 155 |
| | Polishing scratches | — | Small | Small | Small | Small | Small | Small | Very large | Small |

Particle-Linked Type Silica Pine Particles having Sterically Branched Structure (Sterically Linked Particles)

Subsequently, other examples of the invention are described in Example 2 and Comparative 2. Particle-linked type silica fine particles having a sterically branched structure of the invention are characterized by being in a chain shape and including a structure having at least one branch (a) and a steric structure with respect to this structure. More specifically, the particle-linked type silica fine particles have a chain structure (Ch) as shown in FIG. 2 where primary silica fine particles shown by white circles are linked in chains. Further, primary silica fine particles are linked to the chain structure (Ch), forming branches (a). It is only required that at least one branch (a) is formed, and the number thereof is not particularly limited. The chain structure (Ch) and the branch(es) (a) are on substantially the same plane. A primary silica fine particle shown by a black circle is bonded to the plane in a direction intersecting with the branch (a) at an angle to the plane (hereinafter also referred to as "steric direction"), forming a branch (b) or an end (c) to provide a steric structure.

Specifically, the wording of including a structure having at least one branch (a) and a steric structure with respect to this structure means at least one of a structure (1) or a structure (2) below:

(1) a branch (b) extending in the steric direction with respect to the branch (a); and (2) an end (c) extending in the steric direction with respect to the branch (a).

The chain shape, which refers to an elongated structure formed by linked silica fine particles, may be also referred to as a curved shape or a linear shape. Note that a particle-linked structure in which such chain particles are bonded at both ends to form a ring, a net structure, a structure in which primary silica fine particles aggregate in a tetrapod shape, and an irregular aggregate of primary silica fine particles (e.g., a clumpy aggregate including primary silica fine particles) are not included in the chain shape.

The branch (a) means a branched structure in which a primary silica fine particle or an end of a linked body of primary silica fine particles is bonded, in any other direction than the linear direction, to a particle except for the primary silica fine particles at both ends of sterically linked particles (a chain portion of the sterically linked particles that contains the primary silica fine particle(s) of the branch(es) (a) is referred to as a "main chain".)

The branch (b) means a branched structure in which a primary silica fine particle or an end of a linked body of primary silica fine particles is bonded, in any other direction than the linear direction, to a particle except for the primary silica fine particles at both ends of sterically linked particles, and the branch (b) extends in the steric direction with respect to the extending direction of the branch (a). The steric direction can be determined using a transmission electron micrograph as described later.

The end (c) means a bent structure in which a primary silica fine particle or an end of a linked body of primary silica fine particles is bonded, in any other direction than the linear direction, to a particle except for the primary silica fine particles at both ends of sterically linked particles, and the end (c) extends in the steric direction with respect to the extending direction of the branch (a). The steric direction can be determined using a transmission electron micrograph as described later.

An average linked number of primary silica fine particles in the particle-linked type silica fine particles having the sterically branched structure is preferably in a range of 5 to 20.

Analysis Method in Example 2 and Comparative 2

Preferred Example 2 of the invention is described below. The respective properties in Example 2 and Comparative 2 were measured by methods below, unless otherwise specified.

[1] Method of Measuring Average Particle Size by Dynamic Light Scattering Method A method of measuring an average particle size (D1) of particle-linked type silica fine particles by the dynamic light scattering method is as follows.

A sample (dispersion containing particle-linked type silica fine particles) is diluted with 0.58% ammonia water to adjust the silica concentration to 1 mass %, followed by measurement using a laser particle analyzer (e.g., a particle size measuring device (1)).

Particle Size Measuring Device (1)

Model number "Zeta-potential & Particle size Analyzer ELSZ-1000" produced by Otsuka Electronics Co., Ltd. (measurement principle: dynamic light scattering, light source wavelength: 665.70 nm, temperature adjustment range: 10 to 90 degrees C., cell: 10 mm square plastic cell)

[2] Method of Measuring the Number of Particle-Linked Type Silica Fine Particles Having Steric Structure (Sterically Linked Particles) in Dispersion of Particle-Linked Type Silica Fine Particles (Linked Particle Dispersion) and Method of Calculating Ratio of the Number of Sterically Linked Particles 1. Preparation of Measurement Sample (1) A dispersion of particle-linked type silica fine particles was concentrated or diluted with ion-exchange water to a solid content concentration of 0.05 mass %, (2) Ultrasound was applied to the dispersion having a solid content concentration of 0.05 mass % prepared in (1), and 0.1 g thereof was used as a sample for micrography.

2. Method of Measuring Linked Particles and Method of Measuring Ratio of the Number of Sterically Linked Particles (1) An image of the sample prepared in 1. was taken by a transmission electron microscope (ultra-high resolution scanning electron microscope, model number S-5500, produced by Hitachi, Ltd.) at a magnification of 200,000×.

(2) 200 particles each of which was at least linked with another particle were randomly selected in the obtained micrograph.

(3) The sterically linked particles were determined among those particles, and the number of the sterically linked particles was counted.

Criteria for determining the sterically linked particles are as follows. Specifically, the particle-linked type silica fine particles determined above are confirmed as to whether to meet requirements 1) to 3) as below.

1) Primary silica fine particles have the chain structure, and the linked number of the primary silica fine particles is 5 or more.

2) Main-chain forming particles include at least one particle that forms the branch (branch(a)) and that is bonded to any other particle than particles at ends.

3) A particle overlapping with the particle of the branch (a) has a portion with a darker color than that of other primary particles.

The particle-linked type silica fine particles satisfying the above requirements 1) to 3) are determined to have the steric structure in which the branch (b) or the end (c) extending in the steric direction with respect to the branch (a) is formed, and thus are determined as the sterically linked particles.

(4) A value in number % of sterically linked particles is determined by counting the number of sterically linked particles per 200 linked particles and expressing the value as a percentage.

(5) A value in volume % of sterically linked particles is determined as follows.

DLa and DTa are used to determine an average particle size DLT by an image analysis method. DLT is represented by the following formula.

$$DLT=(DLa+DTa)/2$$

Provided that DLT (average particle size) of sterically linked particles is defined as DLTt, DLT (average particle size) of planar linked particles is defined as DLTp, a volume of the sterically linked particles is defined as VLTt, and a volume of the planar linked particles is defined as VLTp, VLTt and VLTp are determined as follows.

$$VLTt=\sum(DLTt/Dp)^3\times(\text{number \% of sterically linked particles})$$

$$VLTp=\sum(DLTp/Dp)^3\times(\text{number \% of planar linked particles})$$

The value in volume % (W) of the sterically linked particles can be determined from VLTt and VLTp in accordance with the following formula.

$$W=VLTt/(VLTp+VLTt)\times 100$$

where, Dp is an average particle size [nm] of single particles.

[3] Method of Measuring Average Linked Number of Sterically Linked Particles

1. Method of Measuring Average Linked Number of Sterically Linked Particles (1) An electron micrograph measured in the same manner as in [2] was prepared.

(2) In the electron micrograph, the linked number of primary silica fine particles in sterically linked particles was counted visually, (3) Randomly selected 50 sterically linked particles were subjected to (2), and the linked number of primary silica fine particles was averaged. The average value was determined as the average linked number of sterically linked particles.

2. Method of Measuring Average Particle Size [F] of Primary Silica Fine Particles in Sterically Linked Particles (1) An electron micrograph measured in the same manner as in [2] was prepared.

(2) In the electron micrograph, the particle sizes of primary silica fine particles in sterically linked particles were measured, and an average value thereof was determined.

(3) Randomly selected 50 sterically linked particles were subjected to (2), and an average value of the 50 particles was determined as the average particle size [F].

Planar linked particles were also measured similarly to the above.

[4] Method of Measuring Average Longest Size in Length Direction (DLa) and Average Size in Thickness Direction (DTa) of Particle-Linked Type Silica Fine Particles Having Sterically Branched Structure (Sterically Linked Particles)

1. Preparation of Measurement Sample and Micrography by Scanning Electron Microscope (SEM)

Preparation of a measurement sample and SEM micrography were performed according to 1. Preparation of Measurement Sample of [2].

2. Method of Measuring Average Longest Size in Length Direction (DLa) of Sterically Linked Particles (1) The length of the longest line segment among line segments each across two points in the particle contour of sterically linked particles was determined using the electron micrograph used in [2], and the longest line segment was taken as a longest size (DL).

(2) Randomly selected 50 sterically linked particles were subjected to (1), and an average value thereof (the total value of respective DL of the 50 sterically linked particles/50) was taken as an average longest size in the length direction DLa.

3. Method of Measuring Average Size in Thickness Direction (DTa) of Sterically Linked Particles (1) The direction of the longest line segment among line segments each across two points in the particle contour of sterically linked particles was defined as the length direction using the electron micrograph used in [2], and a direction orthogonal to the length direction was defined as the thickness direction.

(2) Two intersection points where the line segment orthogonal to the DL intersects with the particle contour were determined, and the line segment longest in distance between the two intersection points was taken as DT.

(3) The measurement described in (2) was performed for 50 sterically linked particles randomly selected, and an average value thereof (the total value of respective DT of the 50 sterically linked particles/50) was taken as an average size in the thickness direction DTa.

4. The measurement described in (2) was performed for 50 sterically linked particles randomly selected, and a coefficient of variation was determined for the DT value of each of the 50 sterically linked particles. Those coefficients of variation were averaged, and the average value was taken as average variation coefficient (C.V.).

[5] Method of Measuring Silanol Group Density Measurement of Specific Surface Area and Measurement of Average Particle Size by Na Titration Method 1) A sample corresponding to 1.5 g of $SiO_2$ is collected in a beaker and placed in a thermostatic reactor (25 degrees C.), and a liquid volume is made to 90 mL by adding pure water (the following operation was performed in the thermostatic reactor kept at 25 degrees C.).

2) To the sample is added 0.1 mol/L hydrochloric acid to adjust the pH to 3.6.

3) To the sample is added 30 g of sodium chloride and diluted with pure water to 150 mL, followed by stirring for 10 minutes.

4) A pH electrode is set and 0.1 mol/L aqueous sodium hydroxide solution is added dropwise with stirring to adjust the pH to 4.0.

5) The sample adjusted to a pH of 4.0 is titrated with 0.1 mol/L aqueous sodium hydroxide solution, the titer and the pH value are recorded at 4 or more points in a pH range of 8.7 to 9.3, and a calibration curve is prepared by setting the titer of the 0.1 mol/L aqueous sodium hydroxide solution as X and the pH value at the time of titration as Y.

6) The consumed amount V (mL) of the 0.1 mol/L aqueous sodium hydroxide solution required for 1.5 g of $SiO_2$ at a pH of 4.0 to 9.0 is determined from a formula (2) below, and the specific surface area SA [$m^2/g$] is determined from a formula (3) below.

$$V=(A\times f\times 100\times 1.5)/(W\times C) \tag{2}$$

where, A represents the titer (mL) of 0.1 mol/L aqueous sodium hydroxide solution required for 1.5 g of $SiO_2$ at a pH of 4.0 to 9.0, f represents the titer of 0.1 mol/L aqueous sodium hydroxide solution, W represents the amount (g) of collected sample, and C represents the $SiO_2$ concentration (mass %) in the sample.

$$SA=29.0V-28 \tag{3}$$

Further, a particle size in terms of specific surface area D2 (nm) is determined from a formula (4) below.

$$\text{Particle size in terms of specific surface area } D2\ (\text{nm})=6000/(\rho_{SiO2}\times SA) \tag{4}$$

where, $\rho_{SiO2}$ represents a silica particle density of 2.2 [$g/cm^3$].

A surface silanol group density of linked fine particles of the invention is measured as follows.

First, the titer of NaOH is determined according to steps 1) to 6) of Sears method for measuring the specific surface area. Next, a silanol group density p can be calculated from a formula below.

$$\rho=(a\times b\times NA)/(c\times d1)$$

where, ρ represents the silanol group density (particles/$nm^2$), a represents the concentration of NaOH solution used for the titration (mol/L), b represents the amount of consumption of NaOH solution with pH 4 to 9 (mL), NA represents Avogadro number, c represents the silica mass (g), and d1 represents the particle size in terms of specific surface area determined by the nitrogen adsorption method (nm).

The d1 is determined as follows.

Measurement of Specific Surface Area and Average Particle Size by BET Method (Nitrogen Adsorption Method)

Adjustment was performed on 50 mL of particle-linked type silica sol with $HNO_3$ to a pH of 3.5, to which 40 mL of 1-propanol was added. Then, the solution was dried at 110 degrees C. for 16 hours to obtain a sample. The sample was pulverized in a mortar and thereafter burned in a muffle furnace at 500 degrees C. for one hour to obtain a measurement sample. Then, a specific surface area meter (model number: Multisorb 12 produced by Yuasa Ionics Co., Ltd.) was used to calculate the specific surface area from the amount of adsorbed nitrogen by the BET single point process according to the nitrogen adsorption method (BET method).

Specifically, 0.5 g of the sample was placed in a measurement cell and subjected to degassing treatment at 300 degrees C. for 20 minutes under flow of a mixed gas of 30 volume % of nitrogen and 70 volume % of helium, then kept under flow of the mixed gas at the liquid nitrogen temperature, so as to allow the sample to adsorb nitrogen under an equilibrium condition. Next, the temperature of the sample was gradually elevated to room temperature under a continuous flow of the mixed gas, the amount of released nitrogen during this process was detected, and the specific surface area of particle-linked type silica sol was determined from a previously prepared calibration curve. Further, the specific surface area (SA) determined was substituted into the formula (4) to determine the particle size in terms of specific surface area d1.

[6] Cation Colloidal Titration Method (1) As a sample, 80 g of a dispersion of particle-linked type silica fine particles adjusted to have a solid content concentration of 1 mass % is used.

(2) The sample is stirred.

(3) A streaming potential (mV) of the sample before a cation colloidal titrant is added dropwise is measured.

This streaming potential (mV) is taken as a streaming potential I (mV) at a start point of a streaming potential curve.

(4) The cation colloidal titrant (0.001 N poly(diallyldimethylammonium chloride) solution) is added dropwise to the sample under stirring while the streaming potential is measured.

(5) The streaming potential curve is obtained by plotting a relationship between the amount of consumption (mL) of the cation colloidal titrant and the streaming potential (mV) of the sample. The amount of consumption of the cation colloidal titrant is scaled on the X-axis, and the streaming potential of the sample is scaled on the Y-axis.

(6) On the streaming potential curve, a point (inflection point) where the streaming potential abruptly changes relative to the amount of consumption of the cation colloidal titrant is taken as a knick. The amount of consumption V (mL) of the cation colloidal titrant and the streaming potential C (mV) at the knick are determined.

(7) A ratio (ΔPCDN) of the amount of change in the streaming potential (ΔPCD) to the amount of consumption (V) of the cation colloidal titrant at the knick is determined from a formula (F1) below.

$$\Delta PCD/V = (I - C)/V \quad \text{(F1)}$$

where, C represents the streaming potential (mV) at the knick, I represents the streaming potential (mV) at the start point of the streaming potential curve; and V represents the amount of consumption (mL) of the cation colloidal titrant at the knick.

[7] Method of Measuring Content Rate of Each of Ca, Mg, and Al

1. Preparation of Sample

As a sample, 80 g of a dispersion of particle-linked type silica fine particles adjusted to have a solid content concentration of 20 mass % is used.

2. Method of Measuring Content Rate of Each of Ca, Mg, and Al (1) Approximately 1 g of a dispersion of particle-linked type silica fine particles is precisely weighed in a platinum dish.

(2) To (1) is added 3 mL of phosphoric acid, 5 mL of nitric acid, and 10 mL of hydrofluoric acid, followed by heating on a sand bath.

(3) After dried up, a small amount of water and 50 mL of nitric acid are added for dissolution, and the solution is placed in a 100-mL volumetric flask and diluted with water to a total volume of 100 mL.

(4) From the 100 mL of solution, a 10 mL aliquot is taken five times respectively into five 20-mL volumetric flasks, to thereby prepare five 10-mL fractions.

(5) Using these fractions, measurement is performed by an ICP plasma atomic emission spectrometer (SPS5520, produced by SII NanoTechnology, Inc.) based on the standard addition method.

(6) The blank is measured in the same way, and the measured values of the individual elements are then corrected by subtracting therefrom the blank value.

(7) The mass ratio of each of the elements (Ca, Mg, and Al) per unit mass in silica fine particles contained in the dispersion of particle-linked type silica fine particles is determined from the above measured value.

[8] Method of Evaluating Polishing Properties for Substrate having $SiO_2$ Insulating Film (1 μm-Thick) and Method of Preparing Dispersion of Polishing Abrasive Grains Preparation of Dispersion of Polishing Abrasive Grains The dispersion of particle-linked type silica fine particles or the dispersion of silica fine particles in each of Examples and Comparatives was diluted with ion-exchange water to a solid content concentration of 1.0 mass %, and the pH was adjusted to 6.0 by adding 5% nitric acid aqueous solution. A dispersion of polishing abrasive grains was thus prepared.

Polishing Test Method

A substrate having a $SiO_2$ insulating film (1 μm thick) formed thereon by thermal oxidation process was prepared as a substrate to be polished. Next, the substrate to be polished was set on a polishing device (NF300, produced by Nano Factor Co., Ltd.) with a polishing pad ("IC-1000/SUBA400 Concentric Type", produced by Nitta Haas Inc.), and polished at a substrate load of 0.04 MPa, a table rotational speed of 90 rpm, while feeding the dispersion of polishing abrasive grains at a rate of 200 mL/min for one minute.

The polishing rate (nm/min) was calculated based on a change in weight of the substrate, between before and after polishing. The surface smoothness (surface roughness [Ra]) of the substrate was measured using an atomic force microscope (AFM, produced by Hitachi High-Tech Science Corporation). Since the smoothness is substantially proportional to the surface roughness, the surface roughness is shown in Tables.

Average Particle Size of Silica Fine Particles Used as Material

A method of measuring an average particle size of silica fine particles in the dispersion of silica fine particles that were used as a material for producing the dispersion of particle-linked type silica fine particles of the invention is as follows.

Measurement Method

An image of a sample prepared using the dispersion of silica fine particles (solid content concentration: 0.05 mass %) was taken by a transmission electron microscope (magnification: 200,000×). Fifty primary particles were randomly selected in the image. In the respective randomly selected primary particles projected on the micrograph (planarly viewed), a diameter of each circular particle was taken as a particle size. For any other primary particles than the circular particles, a length between two points of the particle contour projected on the micrograph (planarly viewed) was measured to determine the longest length and the shortest length. The longest and shortest lengths were averaged and the average value was taken as a particle size. The particle sizes of the 50 particles were summed, and divided by the number of particles to obtain an average value. The average value was taken as an average particle size of silica.

Acidic Silicic Acid Solution

An aqueous sodium silicate solution ($SiO_2$ concentration: 5 mass %) was allowed to pass through a cation exchange resin column, to thereby prepare an acidic silicic acid solution ($SiO_2$ concentration: 4.6 mass %, pH: 2.3, $SiO_2$/$Na_2O$ [molar ratio]=1,200).

This acidic silicic acid solution was used in Examples and Comparatives below.

Example 2-1

Preparation of Dispersion of Particle-Linked Type Silica Fine Particles

A dispersion of silica fine particles "Cataloid SI-50" (average particle size obtained by SEM image analysis method: 30 nm, solid content concentration: 48 mass %, produced by JGC Catalysts and Chemicals Ltd.) in an amount of 3,100 g was diluted with pure water to a solid content concentration of 15 mass %.

To the dispersion of silica fine particles after dilution, 1,060 g of an aqueous acetic acid solution (concentration: 3.0 mass %) was added ($WB/WLP_1$=0.021) as a pH adjuster to adjust the pH to 4.6.

Next, the dispersion of silica fine particles having the adjusted pH was kept at 70 degrees C. for two hours to obtain a dispersion of particle-linked type silica fine particles.

Through anion exchange, 10,655 g of the thus obtained dispersion of particle-linked type silica fine particles (solid content concentration: 13 mass %) was subjected to acetic acid removal. The pH after acetic acid removal was 10.4.

To 5,067 g of the dispersion of particle-linked type silica fine particles after the acetic acid removal was added 4,128 g of pure water for dilution. To the solution was added 281 g of JIS No. 3 water glass ($SiO_2$ concentration: 24 mass %, $SiO_2$/$Na_2O$ (molar ratio)=3). The pH after the addition of water glass was 10.9.

Subsequently, 35,839 g of an acidic silicic acid solution ($SiO_2$ concentration: 4.6 mass %) (corresponding to $WSNLP_2$=2.5) was added thereto for 14 hours. This facilitated not only particle growth but also growth of neck portions between primary particles. A dispersion of particle-linked type silica fine particles (solid content concentration: 5.2 mass %) was thus obtained.

It was confirmed by the above measurement method that the thus obtained dispersion of particle-linked type silica fine particles contained particle-linked type silica fine particles having the sterically branched structure. The ratio of the number of particle-linked type silica fine particles having the sterically branched structure (three-dimensional branched structure) was 14%.

This dispersion of particle-linked type silica fine particles was concentrated in an ultrafiltration device, adjusting the $SiO_2$ concentration to 12%. Further, this dispersion of particle-linked type silica fine particles was concentrated in a rotary evaporator, adjusting the $SiO_2$ concentration to 40 mass %, Then, respective kinds of measurement were performed.

Example 2-2

Preparation of Dispersion of Particle-Linked Type Silica Fine Particles

A dispersion of silica fine particles "Cataloid SI-45P" (average particle size obtained by SEM image analysis method: 50 nm, solid content concentration: 41 mass %, produced by JGC Catalysts and Chemicals Ltd.) in an amount of 976 g was diluted with pure water to a solid content concentration of 5.1 mass %.

The dispersion of silica fine particles after dilution was desalted with a cation exchange resin (SK1BH produced by Mitsubishi Chemical Corporation). The pH after desalting was 3.6.

To this solution, 146 g of an aqueous ammonium acetate solution (acetic acid concentration: 7.0 mass %, ammonia concentration: 6,500 ppm) was added ($WB/WLP_1$=0.026) as a pH buffer to adjust the pH to 4.5.

Next, the dispersion of silica fine particles having the adjusted pH was kept at 80 degrees C. for 33 hours to obtain a dispersion of particle-linked type silica fine particles.

Through anion exchange, 2,500 g of the thus obtained dispersion of particle-linked type silica fine particles (solid content concentration: 5.0 mass %) was subjected to acetic acid removal. The pH after acetic acid removal was 9.0.

To 2,134 g of the dispersion of particle-linked type silica fine particles after the acetic acid removal was added 102 g of pure water for dilution. An aqueous ammonia solution (concentration: 3 mass %) was added to this solution to adjust the pH to 10.8.

Subsequently, 6,386 g of an acidic silicic acid solution ($SiO_2$ concentration: 4.6 mass %) (corresponding to $WS/WLP_2$=2.8) was added thereto for 18 hours. This facilitated not only particle growth but also growth of neck portions between primary particles. A dispersion of particle-linked type silica fine particles (solid content concentration: 4.4 mass %) was thus obtained.

It was confirmed by the above measurement method that the thus obtained dispersion of particle-linked type silica fine particles contained particle-linked type silica fine particles having the sterically branched structure. The ratio of the number of particle-linked type silica fine particles having the sterically branched structure (three-dimensional branched structure) was 25%.

The concentration and respective kinds of measurement of the obtained dispersion of particle-linked type silica fine particles were performed in the same manner as in Example 2-1.

Example 2-3

Preparation of Dispersion of Particle-Linked Type Silica Fine Particles

A dispersion of silica fine particles "Cataloid SI-80P" (average particle size obtained by SEM image analysis method: 100 nm, solid content concentration: 41 mass %, produced by JGC Catalysts and Chemicals Ltd.) in an amount of 634 g was diluted with pure water to a solid content concentration of 10.5 mass %.

The dispersion of silica fine particles after dilution was desalted with a cation exchange resin (SK1BH produced by Mitsubishi Chemical Corporation). The pH after desalting was 3.2.

To this solution, 61 g of an aqueous ammonium acetate solution (acetic acid concentration: 7.0 mass %, ammonia concentration: 6,500 ppm) was added ($WB/WLP_1$=0.016) as a pH buffer to adjust the pH to 4.5.

Next, the dispersion of silica fine particles having the adjusted pH was kept at 90 degrees C. for 20 hours to obtain a dispersion of particle-linked type silica fine particles.

Through anion exchange, 800 g of the thus obtained dispersion of particle-linked type silica fine particles (solid content concentration: 9.5 mass %) was subjected to acetic acid removal. The pH after acetic acid removal was 10.1.

To 700 g of the dispersion of particle-linked type silica fine particles after the acetic acid removal was added 1,633 g of pure water for dilution. An aqueous ammonia solution (concentration: 3 mass %) was added to this solution to adjust the 25 pH to 11.0.

Subsequently, 4,468 g of a dilute acidic silicic acid solution ($SiO_2$ concentration: 2.3 mass %) obtained by diluting an acidic silicic acid solution ($SiO_2$ concentration: 4.6 mass %) with pure water was added (corresponding to $WS/WLP_2$=1.5) for 24 hours. This facilitated not only particle growth but also growth of neck portions between primary particles. A dispersion of particle-linked type silica fine particles (solid content concentration: 2.5 mass %) was thus obtained.

It was confirmed by the above measurement method that the thus obtained dispersion of particle-linked type silica fine particles contained particle-linked type silica fine particles having the sterically branched structure. The ratio of the number of particle-linked type silica fine particles having the sterically branched structure (three-dimensional branched structure) was 14%.

The concentration and respective kinds of measurement of the obtained dispersion of particle-linked type silica fine particles were performed in the same manner as in Example 2-1.

Example 2-4

Preparation of Dispersion of Particle-Linked Type Silica Fine Particles

A dispersion of silica fine particles "Cataloid SS-160" (average particle size obtained by SEM image analysis method: 160 nm, solid content concentration: 14 mass %, produced by JGC Catalysts and Chemicals Ltd.) in an amount of 927 g was diluted with pure water to a solid content concentration of 11 mass %.

The dispersion of silica fine particles after dilution was desalted with a cation exchange resin (SK1BH produced by Mitsubishi Chemical Corporation). The pH after desalting was 2.7.

To this solution, 122 g of an aqueous ammonium acetate solution (acetic acid concentration: 7.0 mass %, ammonia concentration: 6,500 ppm) was added ($WB/WLP_1$=0.066) as a pH buffer to adjust the pH to 4.4.

Next, the dispersion of silica fine particles having the adjusted pH was kept at 90 degrees C. for 54 hours to obtain a dispersion of particle-linked type silica fine particles.

Through anion exchange, 915 g of the thus obtained dispersion of particle-linked type silica fine particles (solid content concentration: 9.5 mass %) was subjected to acetic acid removal. The pH after acetic acid removal was 10.5.

To 740 g of the dispersion of particle-linked type silica fine particles after the acetic acid removal was added 1,593 g of pure water for dilution.

Subsequently, 2,472 g of a dilute acidic silicic acid solution ($SiO_2$ concentration: 1.2 mass %) obtained by diluting an acidic silicic acid solution ($SiO_2$ concentration: 4.6 mass %) with pure water was added (corresponding to $WS/WLP_2$=0.4) for 48 hours. This facilitated not only particle growth but also growth of neck portions between primary particles. A dispersion of particle-linked type silica fine particles (solid content concentration: 2 mass %) was thus obtained.

Further, ammonia water (concentration: 5 mass %) and a silicic acid solution were added to the thus obtained 3,000 g of dispersion of particle-linked type silica fine particles at the same time to achieve build-up, to thereby obtain sterically linked particles.

To the obtained dispersion of particle-linked type silica fine particles, 99 g of an aqueous ammonia solution (concentration: 3 mass %) and 6,194 g of the dilute acidic silicic acid solution ($SiO_2$ concentration: 1.2 mass %) were simultaneously added ($WS/WLP_2$=1.2) for 48 hours. A dispersion of particle-linked type silica fine particles (solid content concentration: 1.8 mass %) was thus obtained.

It was confirmed by the above measurement method that the thus obtained dispersion of particle-linked type silica fine particles contained particle-linked type silica fine particles having the sterically branched structure. The ratio of the number of particle-linked type silica fine particles having the sterically branched structure (three-dimensional branched structure) was 7%.

The concentration and respective kinds of measurement of the obtained dispersion of particle-linked type silica fine particles were performed in the same manner as in Example 2-1.

Example 2-5

A dispersion of silica fine particles "Cataloid SI-50" (average particle size obtained by SEM image analysis method: 30 nm, solid content concentration: 48 mass %, produced by JGC Catalysts and Chemicals Ltd.) in an amount of 3,100 g was diluted with pure water to a solid content concentration of 15 mass %.

To this solution, 1,060 g of an aqueous acetic acid solution (concentration: 3.0 mass %) was added as a pH adjuster ($WB/WLP_1$=0.021) to adjust the pH to 4.6.

Next, the dispersion of silica fine particles having the adjusted pH was kept at 70 degrees C. for two hours to obtain a dispersion of particle-linked type silica fine particles.

The thus obtained 10,655 g of the dispersion of particle-linked type silica fine particles (solid content concentration: 13.0 mass %) was subdivided. To the subdivided 5,067 g of the dispersion of particle-linked type silica fine particles, 4,128 g of pure water was added for dilution without the acetic acid removal process.

To the total amount of the dilute dispersion of particle-linked type silica fine particles was added 459 g of JIS No. 3 water glass ($SiO_2$ concentration: 24 mass %, $SiO_2/Na_2O$ (molar ratio)=3). The pH after the addition of water glass was 10.9.

Subsequently, 35,839 g of an acidic silicic acid solution ($SiO_2$ concentration: 4.6 mass %) (corresponding to $WS/WLP_2$=2.5) was added thereto for 14 hours. This facilitated not only particle growth but also growth of neck portions between primary particles. A dispersion of particle-linked type silica fine particles (solid content concentration: 5.2 mass %) was thus obtained.

It was confirmed by the above measurement method that the thus obtained dispersion of particle-linked type silica fine particles contained particle-linked type silica fine particles having the sterically branched structure. The ratio of the number of particle-linked type silica fine particles having the sterically branched structure (three-dimensional branched structure) was 14%.

The concentration and respective kinds of measurement of the obtained dispersion of particle-linked type silica fine particles were performed in the same manner as in Example 2-1.

Example 2-6

A dispersion of silica fine particles “Cataloid SI-50” (average particle size obtained by SEM image analysis method: 30 nm, solid content concentration: 48 mass %, produced by JGC Catalysts and Chemicals Ltd.) in an amount of 3,100 g was diluted with pure water to a solid content concentration of 15 mass %.

To this solution, 1,060 g of an aqueous acetic acid solution (concentration: 3.0 mass %) was added as a pH adjuster ($WB/WLP_1$=0.021) to adjust the pH to 4.6.

Next, the dispersion of silica fine particles having the adjusted pH was kept at 70 degrees C. for two hours to obtain a dispersion of particle-linked type silica fine particles.

The obtained dispersion of particle-linked type silica fine particles had a $SiO_2$ concentration of 13 mass %. It was confirmed by the above measurement method that the particle-linked type silica fine particles having the sterically branched structure were contained. The ratio of the number of particle-linked type silica fine particles having the sterically branched structure (three-dimensional branched structure) was 15%.

The concentration and respective kinds of measurement of the obtained dispersion of particle-linked type silica fine particles were performed in the same manner as in Example 2-1.

Comparative 2-1

Preparation of Dispersion of Silica Fine Particles (Average Particle Size of Silica Fine Particles: 60 nm)

There were mixed 12,090 g of ethanol and 6,363.9 g of ethyl orthosilicate to prepare a mixed solution a. Next, 6,120 g of ultrapure water and 444.9 g of an aqueous ammonia solution (concentration: 29 mass %) were mixed to prepare a mixed solution b.

Next, 192.9 g of ultrapure water and 444.9 g of ethanol were mixed to prepare heel water, followed by stirring to adjust a temperature of the heel water to 75 degrees C. The mixed solutions a and b were added thereto at the same time so that the addition of the respective solutions was completed in 10 hours.

After completion of the addition, the solution was kept at 75 degrees C. for three hours for aging to obtain 9,646.3 g of a dispersion of silica fine particles. The dispersion of silica fine particles was adjusted to have a $SiO_2$ solid content concentration of 19 mass %, and the average particle size thereof was measured by the dynamic light scattering method (PAR-Ill produced by Otsuka Electronics Co., Ltd.). The average particle size was 60 nm.

Comparative 2-2

To 300 g of fumed silica (AEROSIL50 produced by NIPPON AEROSIL CO., LTD.) was added 3,986 g of ion-exchange water, and wet disintegration/grinding was performed using high-purity silica beads with a diameter of 0.25 mm (produced by DAIKEN CHEMICAL CO., LTD., a bead mill LMZ06 produced by Ashizawa Finetech Ltd.). Accordingly, 4,286 g of a dispersion of silica fine particles (solid content concentration: 7 mass %) was obtained. To 2,571 g of the obtained dispersion of silica fine particles was added 3387.7 g of ultrapure water and 29.7 g of ammonia (3 mass %) and mixed, to thereby obtain 6,000 g of a dispersion ($SiO_2$ solid content concentration: 3 mass %).

The average particle size of silica fine particles contained in the dispersion of silica fine particles was 32 nm (SEM image analysis method). A short diameter/long diameter value obtained by the above image analysis method was 0.44.

Comparative 2-3

A dispersion of silica fine particles “Cataloid SI-50” (average particle size obtained by SEM image analysis method: 30 nm, solid content concentration: 48 mass %, produced by JGC Catalysts and Chemicals Ltd.) in an amount of 3,100 g was diluted with pure water to a solid content concentration of 15 mass %. To this solution, 1,060 g of an aqueous acetic acid solution (concentration: 20.0 mass %) was added as a pH adjuster ($WB/WLP_1$=0.142) to adjust the pH to 4.4.

Subsequently, the dispersion of silica fine particles having the adjusted pH was kept at 70 degrees C. for 24 hours. During this process, irregular aggregation of silica fine particles excessively occurred, and sedimentation of some aggregates occurred. The dispersion of particle-linked type silica fine particles according to the invention was thus not obtained.

Comparative 2-4

A dispersion of silica fine particles “Cataloid SI-45P” (average particle size obtained by SEM image analysis method: 50 nm, solid content concentration: 41 mass %, produced by JGC Catalysts and Chemicals Ltd.) in an amount of 976 g was used.

Tables 3 to 5 show the results of the respective kinds of measurement. Table 3 shows features of silica fine particles in the dispersion of linked particles and ΔPCD/V of the dispersion of linked particles. Table 4 shows the ratio of sterically linked particles based on the linked particles. Table 5 shows features of the sterically linked particles. In Table 4, the number of linked particles [c] represents the total of the number of sterically linked particles [a] and the number of planar linked particles [b], and the volume of linked particles [C] represents the total of the volume of sterically linked particles [A] and the volume of planar linked particles [B].

Tables 6 and 7 show measurement results of the average value (Lm) for the neck portion depth and test results of the polishing rate and surface accuracy.

TABLE 3

| | Ex. 2-1 | Ex. 2-2 | Ex. 2-3 | Ex. 2-4 | Ex. 2-5 | Ex. 2-6 |
|---|---|---|---|---|---|---|
| Average particle size D1 [nm] | 153 | 127 | 184 | 310 | 160 | 127 |
| Ca content [ppm] | 6 | 6 | 6 | 4 | 6 | 6 |
| Mg content [ppm] | 8 | 8 | 8 | 7 | 8 | 8 |
| Al content [ppm] | 53 | 53 | 52 | 50 | 53 | 53 |
| Silanol group density [particles/nm$^2$] | 2.0 | 1.2 | 2.8 | 3.7 | 2.1 | 2.0 |
| ΔPCD/V | −31.7 | −141.1 | −153.4 | −250.2 | −45.1 | −12.3 |

TABLE 4

| | Ex. 2-1 | Ex. 2-2 | Ex. 2-3 | Ex. 2-4 | Ex. 2-5 | Ex. 2-6 |
|---|---|---|---|---|---|---|
| Ratio of volume of sterically linked particles [A] (volume %) | 85 | 64 | 56 | 56 | 85 | 80 |
| Ratio of volume of planar linked particles [B] (volume %) | 15 | 36 | 44 | 44 | 15 | 20 |
| Ratio of the number of sterically linked particles [a] (number %) | 14 | 25 | 14 | 7 | 14 | 15 |
| Ratio of the number of planar linked particles [b] (number %) | 86 | 75 | 86 | 93 | 86 | 85 |
| Ratio (parts) of the number of single particles [d] to the number of linked particles [c] (100 parts) | 39 | 90 | 162 | 200 | 40 | 38 |
| Ratio (parts) of volume of single particles [D] to volume of linked particles [C] (100 parts) | 5 | 15 | 33 | 50 | 6 | 10 |

TABLE 5

| Branch (a) Steric structure | Ex. 2-1 present present | Ex. 2-2 present present | Ex. 2-3 present present | Ex. 2-4 present present | Ex. 2-5 present present | Ex. 2-6 present present |
|---|---|---|---|---|---|---|
| Average longest size in length direction DLa [nm] | 156 | 258 | 337 | 819 | 167 | 131 |
| Average size in thickness direction DTa [nm] | 70 | 85 | 158 | 347 | 70 | 55 |
| Average variation coefficient (C.V.) [%] | 29 | 20 | 19 | 19 | 29 | 29 |

TABLE 5-continued

| Branch (a) Steric structure | Ex. 2-1 present present | Ex. 2-2 present present | Ex. 2-3 present present | Ex. 2-4 present present | Ex. 2-5 present present | Ex. 2-6 present present |
|---|---|---|---|---|---|---|
| Average linked number [pieces] | 10 | 8 | 5 | 4 | 11 | 11 |
| Average particle size [F] of primary silica fine particles [nm] | 44 | 80 | 129 | 187 | 46 | 30 |
| Average variation coefficient (C.V. (Lm)) for neck portion depth Lm [%] | 25 | 23 | 20 | 18 | 17 | 30 |

TABLE 6

| | Ex. 2-1 | Ex. 2-2 | Ex. 2-3 | Ex. 2-4 | Ex. 2-5 | Ex. 2-6 |
|---|---|---|---|---|---|---|
| Lm [nm] | 4 | 17 | 23 | 31 | 4 | 8 |
| Polishing rate [nm/min] | 79 | 72 | 87 | 65 | 80 | 30 |
| Surface roughness Ra [nm] | 0.20 | 0.23 | 0.36 | 0.56 | 0.21 | 0.15 |

TABLE 7

| | Comp. 2-1 | Comp. 2-2 | Comp. 2-3 | Comp. 2-4 |
|---|---|---|---|---|
| Lm [nm] | — | — | — | — |
| Polishing rate [nm/min] | 40 | 93 | — | 43 |
| Surface roughness Ra [nm] | 0.28 | 0.81 | — | 0.30 |

As understood from the results of Tables 3 to 5, it was confirmed that the dispersion of particle-linked type silica fine particles having the sterically branched structure according to the invention was obtained in Examples 2-1 to 2-6. Further, as understood from the results of Tables 6 and 7, it was confirmed that the dispersion of particle-linked type silica fine particles obtained in Examples 2-1 to 2-6 had excellent properties such as polishing performance.

The invention claimed is:

1. A dispersion of irregularly shaped silica-based fine particles comprising irregularly shaped silica-based fine particles that satisfy conditions [1] to [4] below:

Condition [1]: an average particle size by a dynamic light scattering method is in a range of 10 nm to 300 nm;

Condition [2]: an average particle size in terms of a nitrogen adsorption method is in a range of 5 nm to 200 nm;

Condition [3]: an average degree of shape irregularity determined through analysis of a scanning electron micrograph, wherein the average degree of shape irregularity is a ratio of a longer side/shorter side of a minimum circumscribed rectangle having a minimum area among circumscribed rectangles circumscribing respective 100 or more randomly selected particles and a value of the average degree of shape irregularity is in a range of 1.2 to 10; and Condition [4]: in a particle size distribution determined through analysis of a scanning electron micrograph, a first group of particles is defined as being a smallest 10% of particles, the first group having a degree of shape irregularity [A], and a second group of particles is defined as being a largest 10% of particles, the second group having a degree of shape irregularity [B], wherein a [B]/[A] value is 1.2 or more.

2. The dispersion of irregularly shaped silica-based fine particles according to claim 1, wherein the [A] value is 1.13 or more in the condition [4].

3. The dispersion of irregularly shaped silica-based fine particles according to claim 1, wherein the irregularly shaped silica-based fine particles satisfy a condition [5] below, Condition [5]: in a case where a degree of shape irregularity of particles is determined through analysis of a scanning electron micrograph, a ratio of irregularly shaped particles to all particles, wherein [a number of particles having a degree of shape irregularity of 1.2 or more]/[a total number of particles]×100%) is 45% or more.

4. The dispersion of irregularly shaped silica-based fine particles according to claim 1, wherein the irregularly shaped silica-based fine particles satisfy a condition [6] below, Condition [6]: provided that a number of the irregularly shaped silica-based fine particles having a steric structure is taken as T and a total number of the irregularly shaped silica-based fine particles is taken as S through analysis of a scanning electron micrograph, a steric structure ratio (T/S×100%) is 10% or more.

5. A method of producing a dispersion of irregularly shaped silica-based fine particles according to claim 1, the method comprising steps (a) to (f) below:

Step (a): obtaining a seed particle precursor dispersion by adjusting an aqueous alkali silicate solution so that a ratio of a number of moles of silica to the number of moles of alkali metal falls within a range of 0.5 to 10, and adding thereto alkali as needed so that a $SiO_2$ concentration falls within a range of 2 mass % to 25 mass % and ionic strength is 0.4 or more;

Step (b): subjecting the seed particle precursor dispersion obtained in the step (a) to heat-aging in a temperature range of 40 degrees C. or more but less than 100 degrees C.;

Step (c): obtaining a seed particle dispersion by adding an acidic silicic acid solution to the seed particle precursor dispersion subjected to the heat-aging in the step (b) so that a molar ratio of an amount of silica in the acidic silicic acid solution to an amount of silica in the seed particle precursor dispersion ([silica amount in acidic silicic acid solution]/[silica amount in seed particle precursor dispersion]) is in a range of 0.5 to 10;

Step (d): adjusting, through addition of alkali as needed, the seed particle dispersion obtained in the step (c) so that the $SiO_2$ concentration falls within a range of 2 mass % to 15 mass % and the ionic strength is 0.25 or more;

Step (e): subjecting the seed particle dispersion obtained in the step (d), of which $SiO_2$ concentration and ionic strength are adjusted, to heat-aging in a temperature range of 40 degrees C. or more but less than 100 degrees C.; and Step (f): obtaining a dispersion of irregularly shaped silica-based fine particles that comprises irregularly shaped silica-based fine particles by adding an acidic silicic acid solution to the seed particle dispersion subjected to the heat-aging in the step (e) so that a molar ratio of an amount of silica in the acidic silicic acid solution to an amount of silica in the seed particle dispersion ([silica amount in acidic silicic acid solution]/[silica amount in seed particle dispersion]) falls within a range of 5 to 20.

6. The method of producing the dispersion of irregularly shaped silica-based fine particles according to claim 5, wherein, in the step (a), the seed particle precursor dispersion is adjusted through the addition of alkali as needed so that the $SiO_2$ concentration falls within a range of 5 mass % to 20 mass % and the ionic strength is 0.4 or more.

7. The method of producing the dispersion of irregularly shaped silica-based fine particles according to claim 5, wherein the irregularly shaped silica-based fine particles have an average degree of shape irregularity of 1.2 to 10.

8. The method of producing the dispersion of irregularly shaped silica-based fine particles according to claim 5, wherein at least one ionic strength adjuster selected from the group consisting of sodium hydroxide and potassium hydroxide and is used as the alkali used in the step (b) and the alkali used in the step (d).

9. The method of producing the dispersion of irregularly shaped silica-based fine particles according to claim 5, wherein no alkali halide is used in all of the steps (a) to (f).

* * * * *